US012005720B2

(12) United States Patent
Miyase et al.

(10) Patent No.: US 12,005,720 B2
(45) Date of Patent: Jun. 11, 2024

(54) IMAGE RECORDING APPARATUS

(71) Applicant: BROTHER KOGYO KABUSHIKI KAISHA, Nagoya (JP)

(72) Inventors: Satoshi Miyase, Nagoya (JP); Yoshinori Osakabe, Seto (JP); Tsuyoshi Kuwayama, Kasugai (JP); Jun Morikawa, Nagoya (JP); Haruka Azechi, Nagoya (JP); Yasuo Ono, Nagoya (JP); Yuto Chiba, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/344,132

(22) Filed: Jun. 29, 2023

(65) Prior Publication Data

US 2023/0382139 A1 Nov. 30, 2023

Related U.S. Application Data

(63) Continuation of application No. 17/939,242, filed on Sep. 7, 2022, now Pat. No. 11,738,583, which is a (Continued)

(30) Foreign Application Priority Data

Mar. 26, 2020 (JP) ................................ 2020-056705
Mar. 26, 2020 (JP) ................................ 2020-056707

(51) Int. Cl.
*B41J 29/13* (2006.01)

(52) U.S. Cl.
CPC .................................... *B41J 29/13* (2013.01)

(58) Field of Classification Search
None
See application file for complete search history.

(56) References Cited

U.S. PATENT DOCUMENTS

2005/0036804 A1 2/2005 Yokoi
2015/0183243 A1 7/2015 Terada et al.
2021/0300087 A1 9/2021 Miyase et al.

FOREIGN PATENT DOCUMENTS

CN 1532641 A 9/2004
JP H01-92135 A 4/1989
(Continued)

OTHER PUBLICATIONS

International Search Report (ISR) and Written Opinion issued to counterpart International Application (PCT/JP2021/012140), dated May 25, 2021.
(Continued)

*Primary Examiner* — Justin Seo
(74) *Attorney, Agent, or Firm* — Scully, Scott, Murphy & Presser, P.C.

(57) ABSTRACT

A first cover moves between a first closed position and a first open position. The first cover is located at another end of a housing when the first cover is located at the first closed position. A second cover moves between a second closed position and a second open position. The second cover is located closer to one end than the first cover is at the first closed position and at the second closed position. A first portion of a first conveyance path is formed between the first cover and the second cover at the first closed position and at the second closed position. A second portion of a second conveyance path is formed at a side of the second cover facing the one end at the second closed position. When the first cover opens the first portion, the second cover is located at the second closed position.

13 Claims, 14 Drawing Sheets

Related U.S. Application Data continuation of application No. 17/210,968, filed on Mar. 24, 2021, now Pat. No. 11,465,429.

(56) References Cited

FOREIGN PATENT DOCUMENTS

| | | | |
|---|---|---|---|
| JP | H4-91954/1992 | U1 | 8/1992 |
| JP | H08337011 | A | 12/1996 |
| JP | 2003-002459 | A | 1/2003 |
| JP | 2004-287017 | A | 10/2004 |
| JP | 2011212859 | A | 10/2011 |
| JP | 2015-124082 | A | 7/2015 |

OTHER PUBLICATIONS

Notice of Allowance dated Jun. 8, 2022 received in U.S. Appl. No. 17/210,968.
Notice of Allowance dated Mar. 29, 2023 received in U.S. Appl. No. 17/939,242.
Notice of Reasons for Refusal dated Sep. 26, 2023 received in Japanese Patent Application No. JP 2020-056707.
Notice of Reasons for Refusal dated Sep. 26, 2023 received in Japanese Patent Application No. JP 2020-056705.

IMAGE RECORDING APPARATUS

REFERENCE TO RELATED APPLICATIONS

This application is a continuation application of U.S. Ser. No. 17/939,242 filed on Sep. 7, 2022 which is a continuation application of U.S. Ser. No. 17/210,968 filed on Mar. 24, 2021, now U.S. Pat. No. 11,465,429 issued on Oct. 11, 2022 and claims priority from Japanese Patent Application Nos. 2020-056705 and 2020-056707 both filed on Mar. 26, 2020. The entire content of each of the priority applications is incorporated herein by reference.

BACKGROUND ART

Technical Field

This disclosure relates to an image recording apparatus.

Background

In an image recording apparatus, a sheet fed from an upper tray is conveyed to a lower print engine via an inner conveyance path. A sheet fed from a lower tray is conveyed to an upper print engine via an outer conveyance path formed outside the inner conveyance path in a housing.

DESCRIPTION

Summary

According to one aspect, this specification discloses an image recording apparatus. The image recording apparatus includes a housing, a first tray, a second tray, a first print engine, a second print engine, a first cover, and a second cover. The housing has one end and an other end spaced apart from each other in a particular direction. A first conveyance path for a first sheet is formed in the housing. A second conveyance path for a second sheet is formed in the housing. The first tray is configured to support the first sheet. The second tray is configured to support the second sheet. The first conveyance path connects the first tray with the first print engine. The first conveyance path includes a first portion. The second conveyance path connects the second tray with the second print engine. The second conveyance path includes a second portion. The first cover is configured to move between: a first closed position at which the first cover covers the first portion, the first cover being located at the other end of the housing when the first cover is located at the first closed position; and a first open position at which the first cover opens the first portion by separating from the first closed position. The second cover is configured to move between: a second closed position at which the second cover covers the second portion, the second cover being located closer to the one end when the first cover is located at the first closed position and the second cover is located at the second closed position, the first portion being formed between the first cover and the second cover when the first cover is located at the first closed position and the second cover is located at the second closed position, the second portion being formed at a side of the second cover facing the one end when the second cover is located at the second closed position; and a second open position at which the second cover opens the second portion by separating from the second closed position. When the first cover opens the first portion, the second cover is located at the second closed position.

BRIEF DESCRIPTION OF THE DRAWINGS

Embodiments in accordance with this disclosure will be described in detail with reference to the following figures wherein:

FIGS. 2A and 2B show states where a first cover 540 is located at a closed position P2*a* and an open position P2*b*, respectively;

FIGS. 6A to 6C are schematic diagrams showing an intermediate conveyance roller pair 490 according to a first modification, wherein FIG. 6A shows a vertical cross section around the rear end portion of the printer 100 along a paper passage center plane C when viewed from the right, FIG. 6B shows the rear side of the guide 520 of FIG. 6A when viewed diagonally from the upper left, and FIG. 6C shows the front side of the first cover 540 of FIG. 6A when viewed diagonally from the upper right;

FIGS. 7A and 7B show states where a first cover 540 is located at a closed position P2*a* and an open position P2*b*, respectively;

FIGS. 9A to 9C are schematic diagrams showing an intermediate conveyance roller pair 490 according to a second modification, wherein FIG. 9A is a schematic view of a vertical cross-section around the rear end of the printer 100 along the paper passage center plane C when viewed from the right, FIG. 7B is a schematic view of the rear side of the second cover 530 of FIG. 9A when viewed diagonally from the upper left, and FIG. 9C is a schematic view of the front side of the first cover 540 of FIG. 9A when viewed diagonally from the upper right;

FIGS. 10A to 10C are schematic diagrams showing an intermediate conveyance roller pair 490 according to a third modification, wherein FIG. 10A is a schematic view of a vertical cross-section around the rear end of the printer 100 along the paper passage center plane C when viewed from the right, FIG. 10B is a schematic view of the first cover 540 shown in FIG. 10A when viewed from the front, and FIG. 10C is a schematic view of a state where the first cover 540 is in the process of opening from the position of FIG. 10A;

FIGS. 11A and 11B are schematic diagrams showing lock mechanisms 700L and 700R of a second cover 530 according to a fourth modification, wherein FIG. 11A shows a lock state, and FIG. 11B shows a release state;

DETAILED DESCRIPTION

Figure 1A:
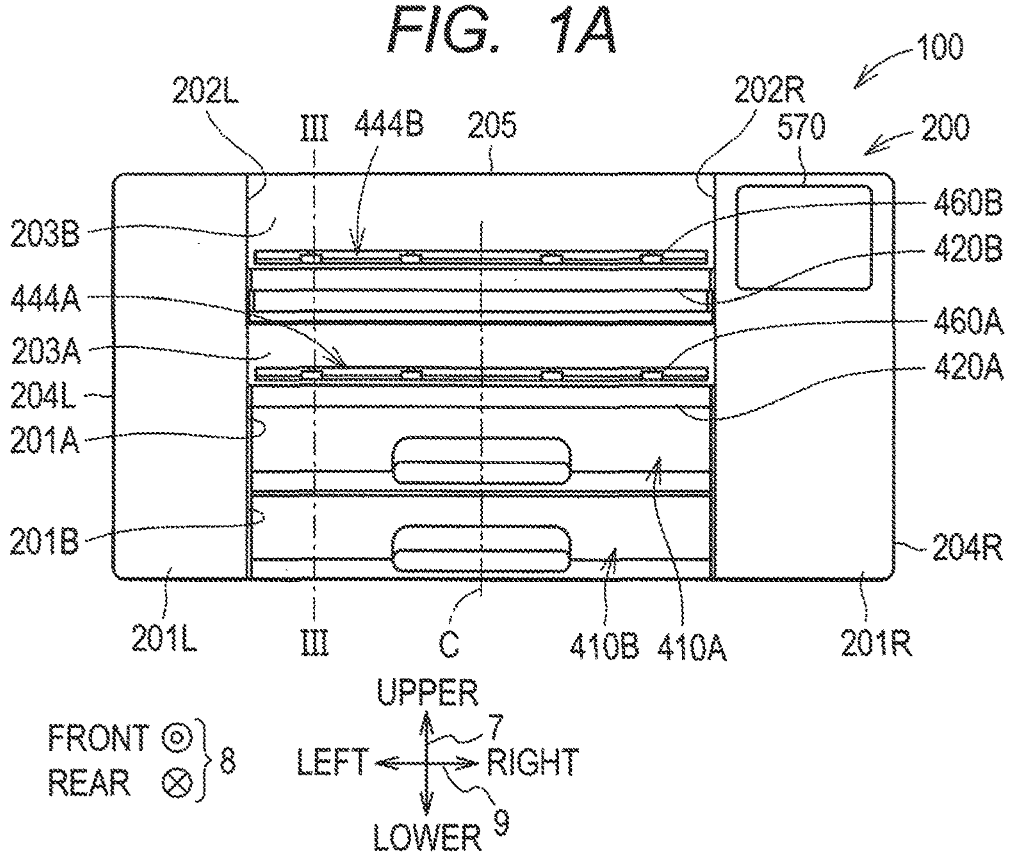
FIGS. 1A and 1B are a front view and a rear view, respectively, schematically showing a printer 100.

In the image recording apparatus, a sheet may be clogged at at least one of the inner conveyance path and the outer conveyance path. In the present specification, clogging of a sheet in the conveyance path is also referred to as a jam. In order to eliminate the sheet clogging, it is conceivable to provide a configuration that the inner conveyance path can be opened in conjunction with the opening of the outer conveyance path. However, in this configuration, even when the sheet is jammed in only the outer conveyance path, the inner conveyance path is also opened. Thus, the upper print engine stops the operation even though the image recording operation can be performed. That is, the operating rate of the image recording apparatus decreases.

In the image recording apparatus, it is conceivable to provide a roller pair on the outer conveyance path in order to stably convey the sheet in the upper print engine. Further, in order to eliminate clogging (that is, a jam) of the sheet in the inner conveyance path, it is conceivable to provide an inner cover that opens the inner conveyance path. However, depending on the arrangement of the roller pair and the inner cover, it becomes difficult to open the inner conveyance path. That is, depending on the arrangement of the conveyance roller provided on one of the two conveyance paths and the cover provided on the other, it becomes difficult to open the other conveyance path.

In view of the foregoing, an aspect of an objective of this disclosure is to provide an image recording apparatus configured to suppress a decrease of the operating rate.

Another aspect of an objective of this disclosure is to provide an image recording apparatus in which a conveyance path is easily opened.

Hereinafter, embodiments of the present disclosure will be described with reference to the drawings as appropriate. In the following description, a vertical direction 7 is defined based on the installation state (the state of FIGS. 1A to 2B) in which a printer 100 is usable, a front-rear direction 8 is defined with front surfaces 201L and 201R as the front side, and a left-right direction 9 is defined when the printer 100 is viewed from the front surfaces 201L and 201R side. The vertical direction 7, the front-rear direction 8 and the left-right direction 9 are perpendicular to each other. In the following description, the direction from the start point to the end point of an arrow is expressed as an orientation, and the line connecting the start point and the end point of the arrow is expressed as the direction. In other words, an orientation is a component of a direction.

Overall Configuration of Printer 100

As shown in FIGS. 1A to 2B, the printer 100 includes, in a housing 200, feed trays 410A, 410B, feed mechanisms 430A, 430B, conveyance paths 440A, 440B, conveyance roller pairs 450A, 450B, discharge roller pairs 460A, 460B, intermediate conveyance roller pair 490, platens 470A, 470B, and recording heads 480A, 480B. The printer 100 includes discharge trays 420A, 420B, a guide 510, a guide 520, a first cover 540, and a second cover 530.

Figure 3A:
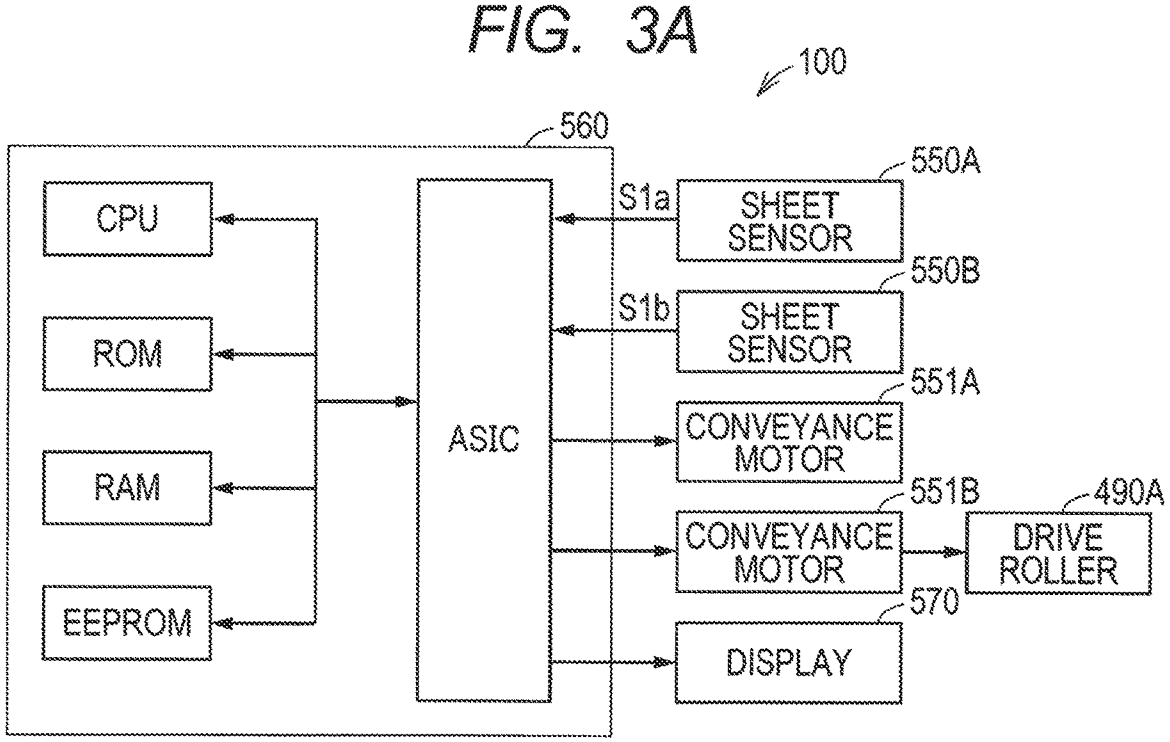
FIG. 3A is a block diagram showing the configuration of the printer 100.

As shown in FIG. 3A, the printer 100 further includes sheet sensors 550A, 550B, conveyance motors 551A, 551B, a controller 560, and a display 570.

The printer 100 is an example of an image recording apparatus. The intermediate conveyance roller pair 490 is an example of a roller pair.

Housing 200

Figure 1B:
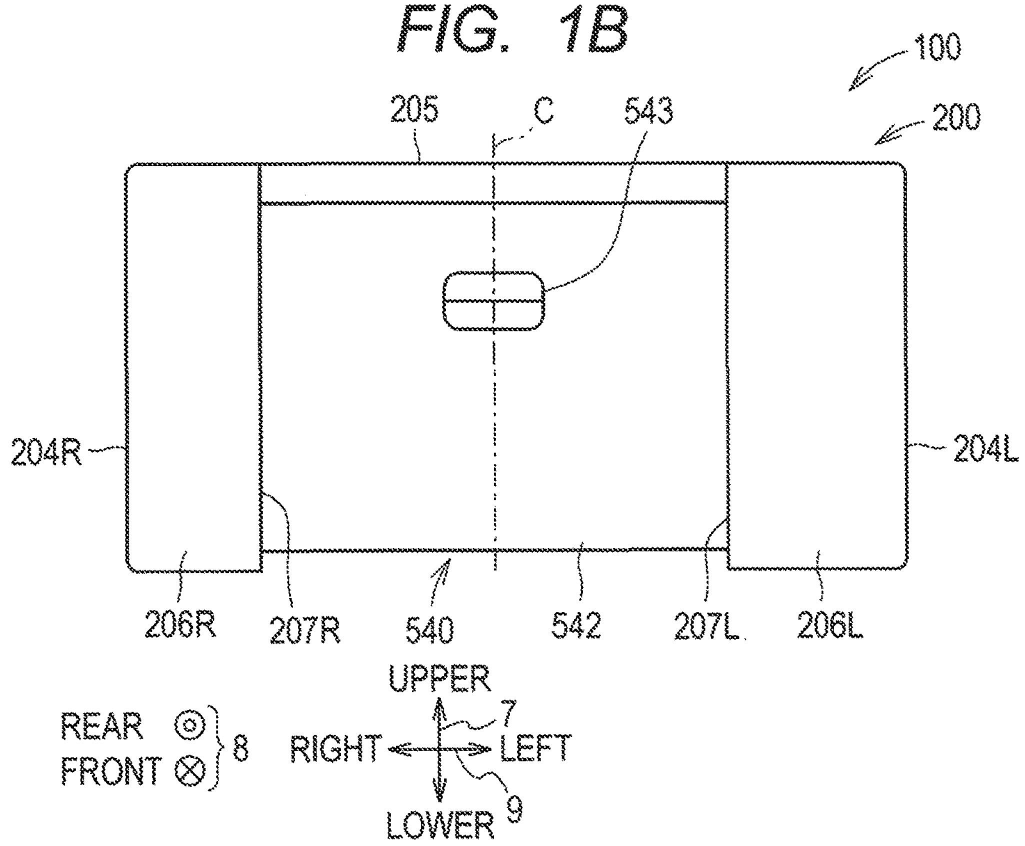

In FIGS. 1A and 1B, the housing 200 is an exterior body having a substantially rectangular parallelepiped outer shape, and is supported by various frames (not shown) in the housing 200.

In FIG. 1A, the housing 200 has front surfaces 201L, 201R, inner side surfaces 202L, 202R, back surfaces 203A, 203B, outer side surfaces 204L, 204R, and an upper surface 205, which define the internal space of the housing 200 relative to the outer space. The front surfaces 201L and 201R are an example of one end of the housing 200. The front-rear direction 8 is an example of a particular direction.

In FIG. 1A, the front surfaces 201L and 201R have a rectangular shape in a front view, and the front surface 201L is located at the left side of the front surface 201R with an interval. Openings 201A and 201B are formed at the lower portion of the space between the front surfaces 201L and 201R. The opening 201A is located above the opening 201B. The openings 201A and 201B are examples of an opening.

The inner side surface 202L extends rearward from the upper portion at the right end of the front surface 201L. The inner side surface 202R extends rearward from the upper portion at the left end of the front surface 201R.

Figure 2A:
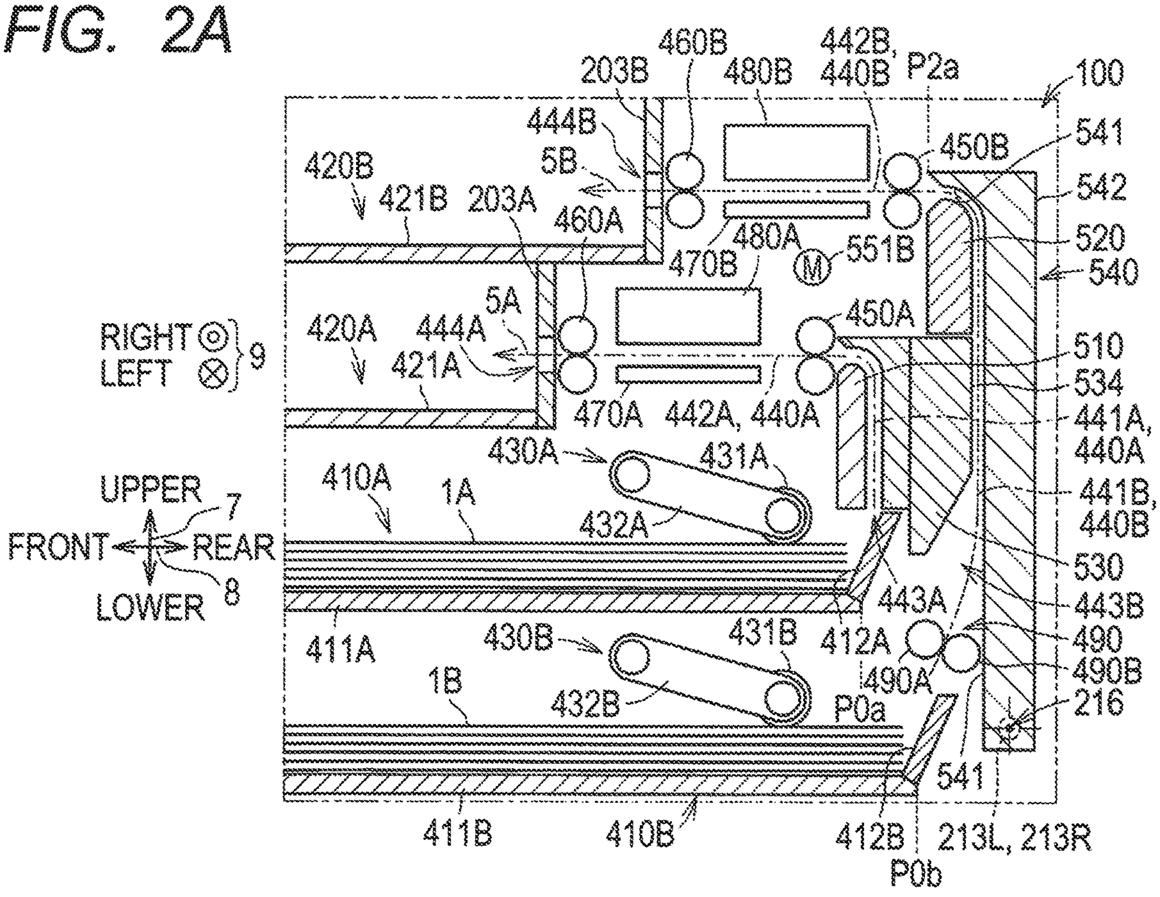
FIGS. 2A and 2B are schematic views showing the internal configuration of the printer 100.

Each of the back surfaces 203A and 203B has a substantially rectangular shape that is long in the left-right direction 9 in a front view, and connects the rear ends of the inner side surfaces 202L and 202R. As shown in FIG. 2A, the back surface 203A is located at a lower and farther forward position than the back surface 203B.

In FIG. 1A, slits elongated in the left-right direction 9 are formed as discharge ports 444A and 444B at positions near the lower ends of the back surfaces 203A and 203B, respectively. In the front view, a part of the discharge roller pairs 460A and 460B is seen through the discharge ports 444A and 444B, respectively.

As shown in FIG. 1B, the housing 200 further includes rear surfaces 206L, 206R and inner side surfaces 207L, 207R.

The rear surfaces 206L and 206R have a substantially rectangular shape when viewed from the rear. The rear surface 206L is located to the left of the rear surface 206R with an interval that is equal to or slightly larger than the length of the first cover 540 in the left-right direction. The rear surfaces 206L and 206R are an example of an other end of the housing 200.

The inner side surface 207L extends forward from the right end of the rear surface 206L, and the inner side surface 207R extends forward from the left end of the rear surface 206R. The inner side surfaces 207L and 207R extend in the vertical direction 7 and the front-rear direction 8. The inner side surfaces 207L and 207R are spaced apart to the left and right by the same distance from a paper passage center plane C described later.

Feed Tray 410A, 410B

Figure 2B:
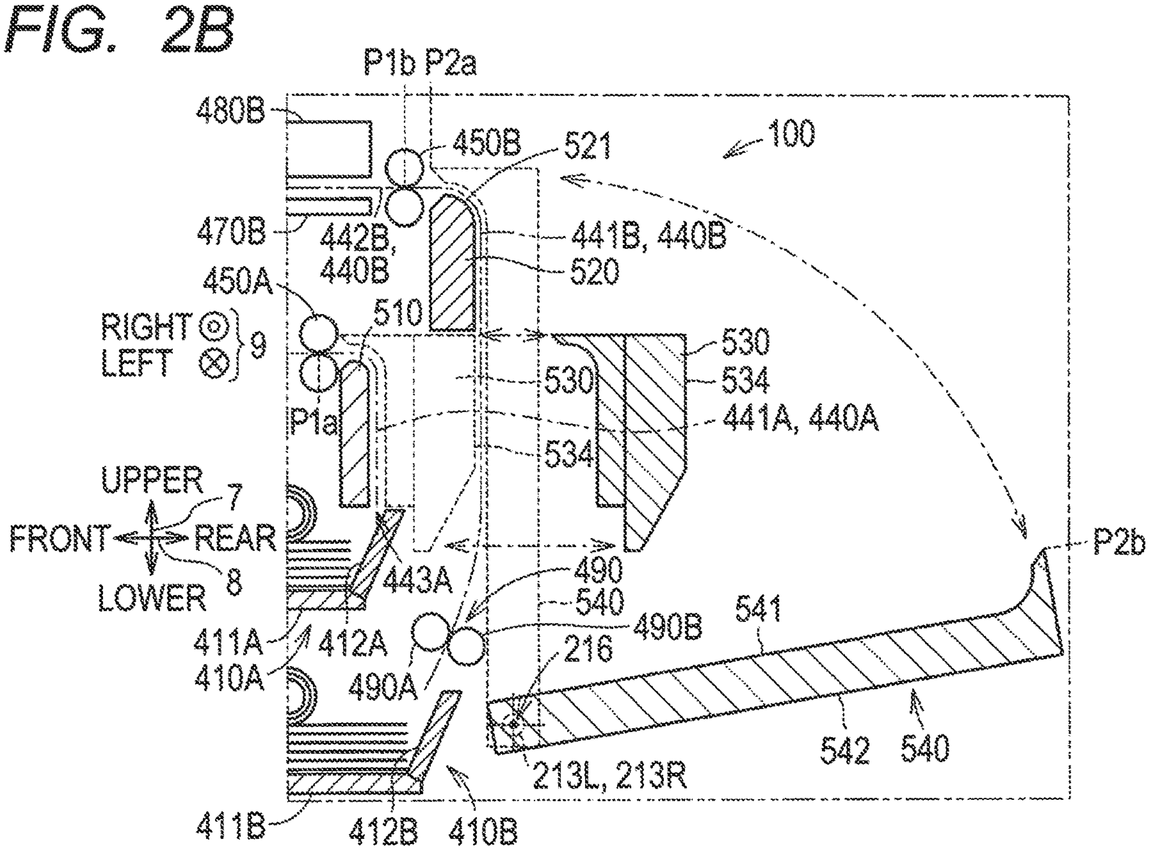

In FIGS. 2A and 2B, the feed trays 410A and 410B move rearward in the housing 200 through the opening 201A and 201B (see FIG. 1A), and are located at mount positions P0*a* and P0*b*, respectively. The feed trays 410A and 410B move forward (an example of a pulling direction) from the mount positions P0*a* and P0*b* in the housing 200 and are pulled out of the housing 200 through the opening 201A and 201B. The mount positions P0*a* and P0*b* are examples of a second mount position and a first mount position.

In FIGS. 2A and 2B, each of the feed trays 410A and 410B has a box-like shape which is thin in the vertical direction 7, and a plurality of sheets 1A and 1B stacked in the vertical direction 7 are supported by bottom portions 411A and 411B, respectively. The sheets 1A and 1B are supported such that the centers of the sheets 1A and 1B in the width direction are aligned with the paper passage center plane C (see FIGS. 1A and 1B) by sheet guides (not shown) provided on the bottom portions 411A and 411B. The paper passage center plane C is an imaginary plane that passes approximately through the center of the discharge ports 444A, 444B and the conveyance paths 440A, 440B (see FIGS. 4A and 4B) in the left-right direction 9 and that is parallel to the vertical direction 7 and the front-rear direction 8.

Each of the feed trays 410A and 410B is configured to support sheets 1A and 1B of various sizes. The sheets 1A and 1B are paper, OHP sheet, and so on. Hereinafter, the maximum widths of sheets 1A and 1B are referred to as maximum widths W1*a* and W1*b* (see FIGS. 4A and 4B). The maximum width W1*a* is less than or equal to the maximum width W1*b*. In this embodiment, the maximum widths W1*a* and W1*b* are equal to each other.

The feed tray 410A is an example of a second tray and a second feed tray. The feed tray 410B is an example of a first tray and a first feed tray. The sheets 1A and 1B are examples of a second sheet and a first sheet, respectively.

Discharge Tray 420A, 420B

As shown in FIGS. 2A and 2B, the discharge trays 420A and 420B extend forward from positions slightly below the discharge ports 444A and 444B between the front surfaces 201L and 201R (see FIGS. 1A and 1B). The discharge trays 420A and 420B support the sheets 1A and 1B discharged from the discharge ports 444A and 444B by upper surfaces 421A and 421B, respectively.

Feed Mechanism 430A, 430B

As shown in FIGS. 2A and 2B, the feed mechanism 430A includes a feed roller 431A and a feed arm 432A, and transmits, to the feed roller 431A, the driving force of the conveyance motor 551A (see FIG. 3A) by a drive transmission mechanism (not shown) housed in the feed arm 432A. Thus, the feed roller 431A rotates forward and feeds the uppermost sheet 1A on the feed tray 410A rearward.

The feed mechanism 430B has the same configuration as the feed mechanism 430A, and feeds the uppermost sheet 1B on the feed tray 410B rearward by the conveyance motor 551B (see FIGS. 2A and 3A), the feed roller 431B, and a feed arm 432B. The feed roller 431B may be rotated by a driving force from a motor different from the conveyance motor 551B. In this case, it is conceivable that the motor different from the conveyance motor 551B is arranged at a position closer to the feed roller 431B. The conveyance motor 551B is an example of a feed motor.

The sheets 1A and 1B are sent rearward by the feed mechanisms 430A and 430B, and then guided rearward and upward by guide surfaces 412A and 412B located at the rear ends of the feed trays 410A and 410B, respectively, and sent to supply ports 443A and 443B of the conveyance paths 440A and 440B, respectively.

Conveyance Path 440A, 440B

As shown in FIGS. 2A and 2B, the conveyance paths 440A and 440B are formed in the housing 200, respectively. The conveyance path 440A is an example of a second conveyance path and an inner conveyance path. The conveyance path 440B is an example of a first conveyance path and an outer conveyance path.

The conveyance path 440A is shown by the double-dot chain line in FIGS. 2A, 2B and 4A, 4B, and has a left-right size slightly larger than the maximum width W1*a*. As shown in FIG. 2A, the conveyance path 440A has a curved portion 441A and a straight portion 442A. The curved portion 441A has a supply port 443A. The supply port 443A is located immediately above the upper end of the guide surface 412A. That is, the curved portion 441A is connected to the feed tray 410A. The curved portion 441A extends upward from the supply port 443A and is curved to head forward at substantially the same vertical position as the discharge port 444A. The straight portion 442A is continuous with the downstream end of the curved portion 441A and extends substantially linearly forward from the downstream end of the curved portion 441A to reach the discharge port 444A. The curved portion 441A is an example of a second portion.

The conveyance path 440B is shown by the double-dot chain line in FIGS. 2A, 2B and 4A, 4B, and connects the feed tray 410B and the discharge port 444B in the housing 200 at the outer side of the conveyance path 440A. In other words, the conveyance path 440A connects the feed tray 410A and the discharge port 444A at one side (that is, inside) of the conveyance path 440B in an intersecting direction that intersects the conveyance direction 5B. The conveyance path 440B has a left-right size slightly larger than the maximum width W1*b*.

Specifically, as shown in FIG. 2A, the conveyance path 440B has a curved portion 441B and a straight portion 442B. The curved portion 441B has a supply port 443B. The supply port 443B is located at a higher and slightly rearward position than the upper end of the guide surface 412B. The curved portion 441B is connected to the feed tray 410B. The curved portion 441B extends upward from the supply port 443B in the housing 200 while passing through the outer side (that is, rearward) of the curved portion 441A. The curved portion 441B bends forward at a higher position than the downstream end of the curved portion 441A and at substantially the same vertical position as the discharge port 444B. The curved portion 441B is an example of a first portion.

The straight portion 442B is continuous with the downstream end of the curved portion 441B and extends substantially linearly forward on the outer side (that is, upper side) of the straight portion 442A to reach the discharge port 444B.

In the conveyance paths 440A and 440B, the sheets 1A and 1B are sent in the conveyance directions 5A and 5B, respectively.

Conveyance Roller Pair 450A, 450B

As shown in FIG. 2B, the conveyance roller pair 450A includes a pair of rollers in contact with each other at a position P1*a* (hereinafter, also referred to as "nip position") at the downstream end of the curved portion 441A (that is, the upstream end of the straight portion 442A). One of the two rollers is rotated by the driving force generated by the conveyance motor 551A (see FIG. 3A). The other of the two rollers contacts the one roller from above, and is rotated by following the rotation of the one roller.

The conveyance roller pair 450B is the same as the conveyance roller pair 450A except that the conveyance roller pair 450B is located at the downstream end of the curved portion 441B (that is, the upstream end of the straight portion 442B) and is rotated by the driving force from the conveyance motor 551B (see FIGS. 2A, 2B and 3A). The position where the conveyance roller pair 450B contacts each other is referred to as a nip position P1*b* (see FIG. 2B). In FIGS. 2A and 2B, the illustration of the conveyance motor 551A is omitted.

By rotating, the conveyance roller pairs 450A and 450B nip the sheets 1A and 1B conveyed through the curved portions 441A and 441B and send the same forward, respectively. Then, the sheets 1A and 1B are conveyed through the straight portions 442A and 442B.

Discharge Roller Pair 460A, 460B

As shown in FIGS. 2A and 2B, the discharge roller pair 460A has two rollers in contact with each other at a position between the platen 470A and the discharge port 444A at the straight portion 442A in the housing 200. One of the two rollers is rotated by the driving force generated by the conveyance motor 551A (see FIG. 3A). The other of the two rollers is a spur, which contacts the one roller from above and is rotated by following the rotation of the one roller.

The discharge roller pair 460B is the same as the discharge roller pair 460A except that the discharge roller pair 460B is located between the platen 470B and the discharge port 444B at the straight portion 442B in the housing 200. Thus, detailed description of the discharge roller pair 460B will be omitted.

The discharge roller pairs 460A and 460B rotate to nip the sheets 1A and 1B conveyed through the straight portions 442A and 442B and send the same forward. Thus, the sheets 1A and 1B are discharged through the discharge ports 444A and 444B.

Platen 470A, 470B

As shown in FIGS. 2A and 2B, the platen 470A is located between the conveyance roller pair 450A and the discharge roller pair 460A in the front-rear direction 8. The platen 470B is located between the conveyance roller pair 450B and the discharge roller pair 460B and farther rearward than the platen 470A in the front-rear direction 8. The platens 470A and 470B support sheets 1A and 1B conveyed through the straight portions 442A and 442B, respectively, with upper surfaces extending directly below the straight portions 442A and 442B in the front-rear direction 8 and the left-right direction 9.

Recording Head 480A, 480B

As shown in FIGS. 2A and 2B, the recording heads 480A and 480B are located slightly upward from the platens 470A and 470B in the vertical direction 7, respectively. That is, the straight portion 442A is located between the platen 470A and the recording head 480A, and the straight portion 442B is located between the platen 470B and the recording head 480B.

The recording head 480B is located at a position shifted rearward from the recording head 480A.

The recording heads 480A and 480B eject ink to sheets 1A and 1B supported by the platens 470A and 470B, respectively. As a result, an image is recorded on each of the sheets 1A and 1B. The recording heads 480A and 480B may be serial heads or line heads. The recording heads 480A and 480B record an image by an inkjet method. Alternatively, an image may be recorded by an electrophotographic method, a thermal transfer method, and so on.

The combination of the platen 470A and the recording head 480A is an example of a second print engine, and the combination of the platen 470B and the recording head 480B is an example of a first print engine. In the present embodiment, the feed tray 410A and the second print engine (the platen 470A and the recording head 480A) are located between the feed tray 410B and the first print engine (the platen 470B and the recording head 480B) in the vertical direction.

Guide 510, Guide 520

Figure 4B:
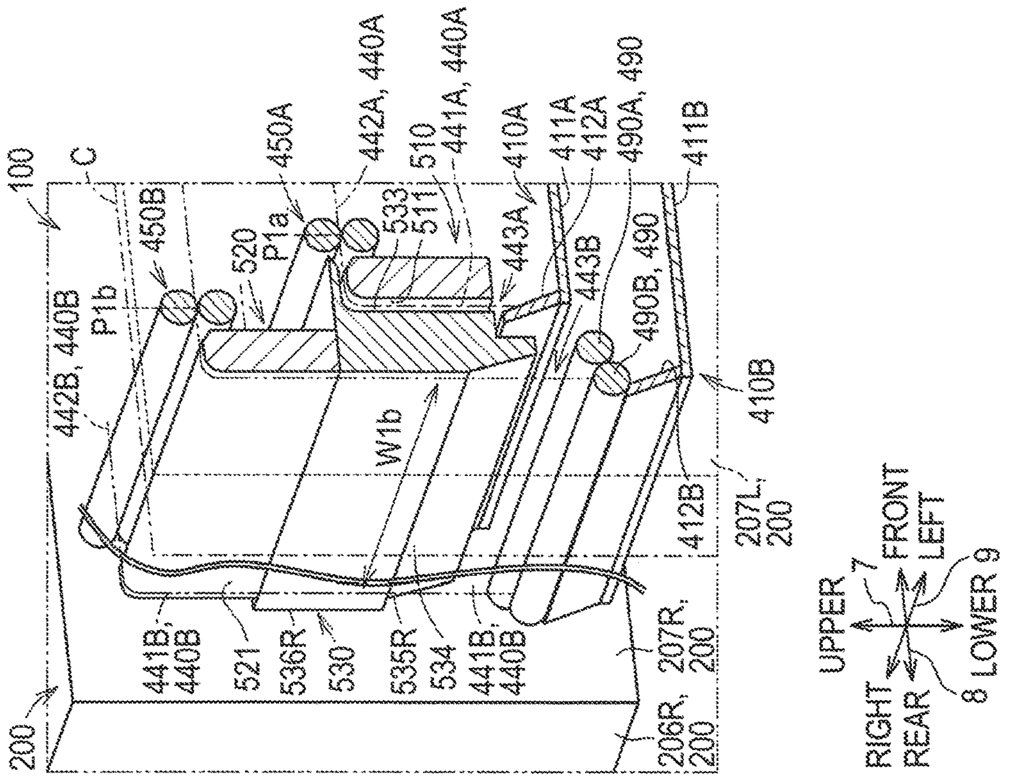
FIG. 4B is a perspective view schematically showing a second cover 530 and the intermediate conveyance roller pair 490 when viewed from diagonally left rear.
Figure 4A:
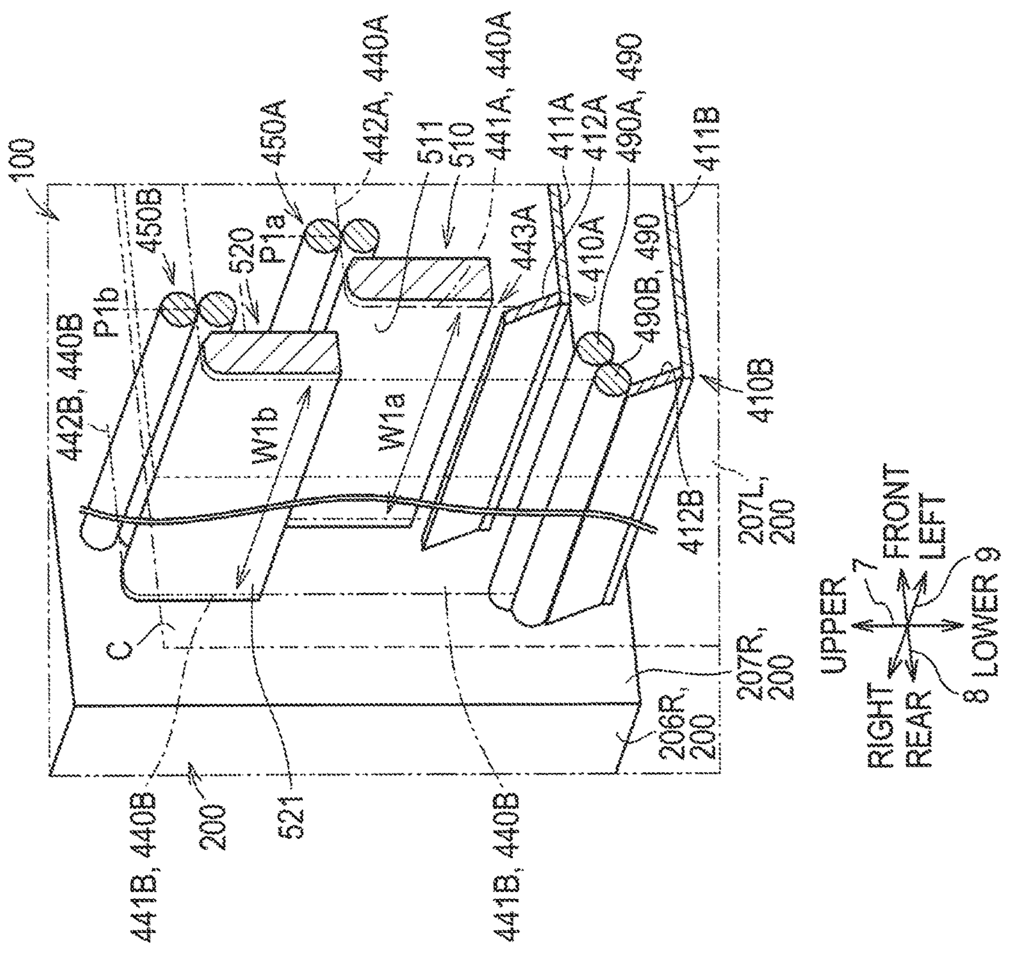
FIG. 4A is a perspective view schematically showing a guide 510, a guide 520, and an intermediate conveyance roller pair 490 when viewed from diagonally left rear.

As shown in FIG. 4A, each of the guide 510 and the guide 520 is attached to the frame within the housing 200 between the inner side surfaces 207L and 207R. Note that FIG. 4A does not show a configuration other than the relevant parts. Regarding the inner side surface 207L, only a part thereof is shown by a broken line. The same goes for FIG. 4B.

In FIGS. 2A, 2B and 4A, the guide 510 has a shape that is thin in the front-rear direction 8 and long in the left-right direction 9. The guide 510 is located at a position slightly rearward of the conveyance roller pair 450A in the front-rear direction 8 and between the supply port 443A and the nip position P1*a* in the vertical direction 7.

In FIG. 4A, the guide 510 has a guide surface 511 that defines the inside (that is, the front side and the lower side) of the curved portion 441A. The guide surface 511 extends upward from a forward position of the curved portion 441A at the lower end position of the curved portion 441A (that is, the vertical position of the supply port 443A), and is curved forward to reach a position slightly below and rearward of the nip position P1*a*. The guide surface 511 has a left-right size slightly larger than the curved portion 441A, and has a symmetrical shape with respect to the paper passage center plane C (hereinafter, simply referred to as "symmetrical").

In FIGS. 2A, 2B and 4A, the guide 520 has a shape that is thin in the front-rear direction 8 and long in the left-right direction 9. The guide 520 is located at a position slightly rearward of the conveyance roller pair 450B in the front-rear direction 8 and between the nip position P1*b* and the upper end of the second cover 530 at the mount position (see FIG. 4B) in the vertical direction 7.

In the following, unless otherwise specified, the term "second cover 530" means "the second cover 530 located at the mount position".

As shown in FIG. 4A, the guide 520 has a guide surface 521 that defines the upper portion of the inside (that is, the front side and the lower side) of the curved portion 441B. The guide surface 521 extends upward from the upper end of a guide surface 534 (see FIG. 4B) of the second cover 530 and is curved forward to reach a position slightly below and rearward of the nip position P1*b*. The guide surface 521 has a left-right size slightly larger than the curved portion 441B, and has a symmetrical shape.

Second Cover 530

As shown in FIG. 4B, the second cover 530 is attached to the mount position between the inner side surfaces 207L and

207R in the housing 200. The second cover 530 is an example of a second cover, and the mount position is an example of a second closed position. As shown in FIG. 4B, the mount position is substantially the same position as the guide 510 in the left-right direction 9, and as shown in FIG. 2A, the mount position is a position at the outer side (that is, rearward) of the guide 510 in the housing 200. As shown in FIG. 2B, the second cover 530 is detachable rearward from the mount position.

As shown in FIG. 4B, the second cover 530 has the guide surface 534. The guide surface 534 defines the lower portion of the inner side (that is, the front side or the side closer to the front end of the housing) of the curved portion 441B. The guide surface 534 extends upward from a farther forward position than the curved portion 441B at the lower end position of the curved portion 441B (that is, the vertical position of the supply port 443B), and reaches the lower end of the guide surface 521. That is, the inner side of the curved portion 441B is defined by the guide surface 521 and the guide surface 534. The guide surface 534 has a left-right size slightly larger than the curved portion 441B, and has a symmetrical shape.

Figure 5A:
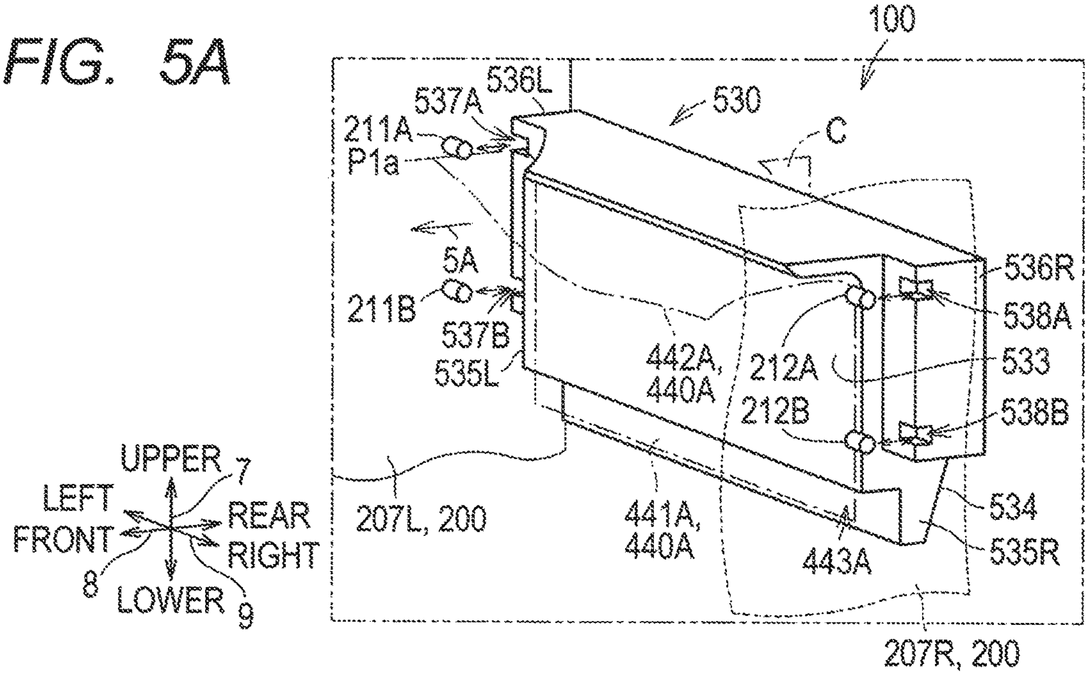
FIG. 5A is a perspective view schematically showing the second cover 530 when viewed from diagonally right front.

As shown in FIG. 5A, the second cover 530 has a guide surface 533. The guide surface 533 defines the outer side (that is, the rear side) of the curved portion 441A. The guide surface 533 extends upward from the rear end of the supply port 443A and is curved forward to reach a slightly higher and farther rearward position than the nip position P1*a* (see FIG. 4B). The guide surface 533 has a left-right size slightly larger than the curved portion 441A, and has a symmetrical shape.

Each of the guide surface 533 and the guide surface 534 may be formed of a single curved surface as in the present embodiment. Alternatively, each of the guide surface 533 and the guide surface 534 may be formed of the tip surfaces of a large number of ribs arranged at intervals in the left-right direction 9.

As shown in FIG. 5A, the second cover 530 further has side surfaces 535L, 535R, and protruding portions 536L, 536R.

The side surface 535R connects the right ends of the guide surface 533 and the guide surface 534. The protruding portion 536R protrudes to the right from the side surface 535R, and has a rectangular protruding end face when viewed in the left-right direction 9. The protruding portion 536R has concave portions 538A and 538B. The concave portion 538A is recessed at an upper position at the right front corner of the protruding portion 536R. Specifically, the concave portion 538A is defined by an upper surface, a lower surface, a rear surface, and a left surface, and has a shape open to the front and to the right. The concave portion 538B is the same as the concave portion 538A except that the concave portion 538B is located below the concave portion 538A in the protruding portion 536R, and thus the description thereof will be omitted.

The side surface 535L and the protruding portion 536L are symmetrical with the side surface 535R and the protruding portion 536R. The protruding portion 536L has concave portions 537A and 537B, which are symmetrical with the concave portions 538A and 538B, respectively.

Positioning Pin

As shown in FIG. 5A, the printer 100 includes positioning pins 211A, 211B, 212A, and 212B. The positioning pin 212A protrudes to the left from the same front-rear position and vertical position as the concave portion 538A at the mount position on the inner side surface 207R of the housing 200. The positioning pin 212B protrudes to the left from the same front-rear position and vertical position as the concave portion 538B at the mount position on the inner side surface 207R. The positioning pins 211A and 211B protrude to the right from positions symmetrical with the positioning pins 212A and 212B on the inner side surface 207L of the housing 200.

The positioning pins 211A, 211B, 212A, and 212B fit into the concave portions 537A, 537B, 538A, and 538B, respectively. As a result, the second cover 530 is positioned at the mount position (see FIGS. 2A and 4B) and closes the curved portion 441A of the conveyance path 440A. When the user applies a rearward force to the second cover 530 in a state where the first cover 540 described later is located at an open position P2*b* (see FIG. 2B), the concave portions 537A, 537B, 538A, and 538B separate rearward from the positioning pins 211A, 211B, 212A, and 212B, respectively. The second cover 530 moves rearward from the mount position and opens the curved portion 441A to the outside.

FIG. 5A shows a part of the inner side surfaces 207L and 207R of the housing 200. The inner side surface 207R is shown by a broken line. The same goes for FIG. 5B.

Shaft 213L, 213R

Figure 5B:
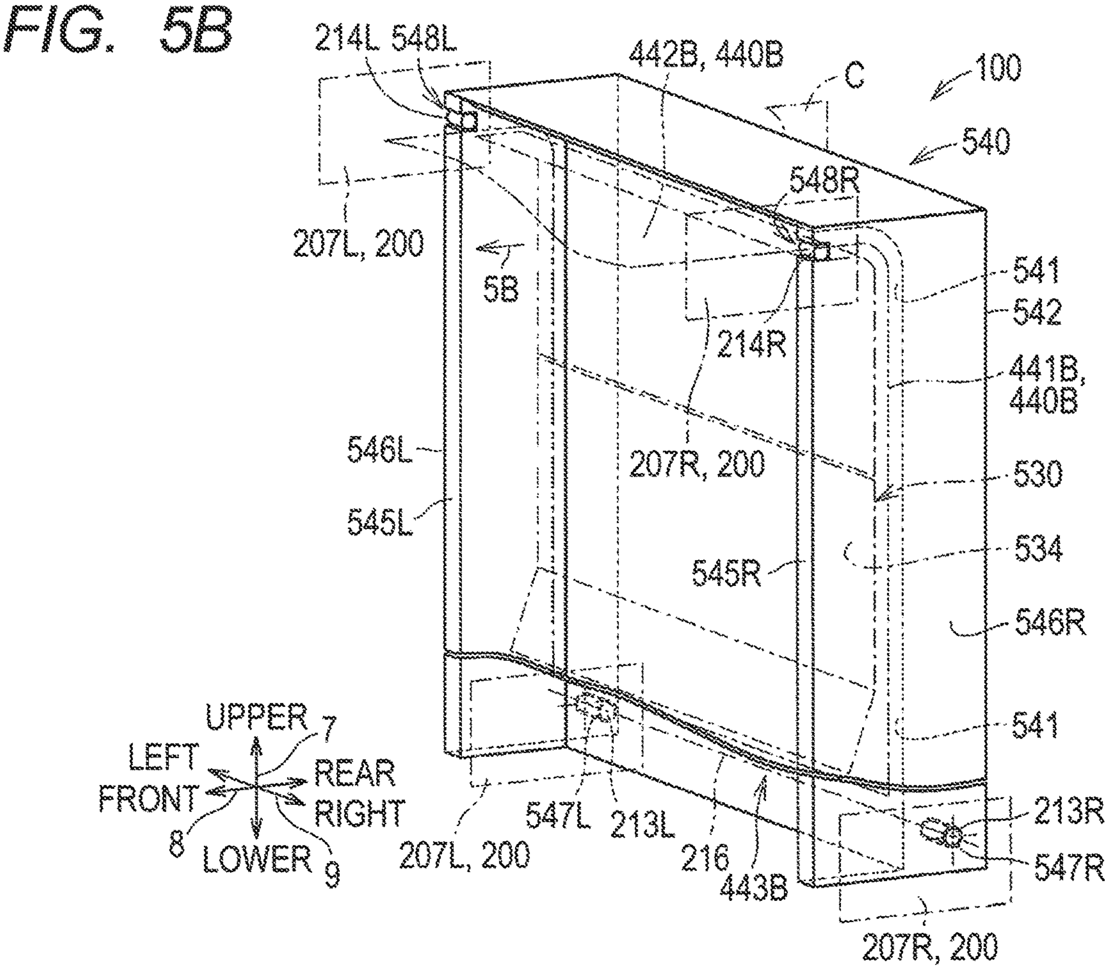
FIG. 5B is a perspective view schematically showing a first cover 540 when viewed from diagonally right front.

As shown in FIG. 5B, the printer 100 includes cylindrical shafts 213L and 213R. The shaft 213L protrudes to the right from the left outer shaft position on the inner side surface 207L of the housing 200. The left outer shaft position is a position farther rearward than the rear end of the curved portion 441B and the feed tray 410B and lower than the upper end of the guide surface 412B of the feed tray 410B (see FIGS. 2A and 2B).

The shaft 213R protrudes to the left from the right outer shaft position on the inner side surface 207R which is symmetrical with the left outer shaft position.

The shafts 213L and 213R share an axis 216 which extends along the left-right direction 9. The shafts 213L and 213R support the vicinity of the lower end of the first cover 540 such that the first cover 540 is rotatably moved between a closed position P2*a* (see FIG. 2A) and the open position P2*b* (see FIG. 2B). The shafts 213L and 213R are examples of outer shafts.

As shown in FIG. 2A, the closed position P2*a* is the position of the first cover 540 when the first cover 540 defines the outer side (an example of the other side of the intersecting direction) of the curved portion 441B of the conveyance path 440B. The closed position P2*a* is an example of a first closed position.

As shown in FIG. 2B, the open position P2*b* is a position separated from the closed position P2*a* in a direction away from the housing 200 in the circumferential direction of the axis 216 (hereinafter, also referred to as a "separation direction"). The open position P2*b* is also the position of the first cover 540 at which the guide surface 521 of the guide 520 and the guide surface 534 of the second cover 530 are exposed to the external space. The open position P2*b* is an example of a first open position.

Hereinafter, unless otherwise specified, the term "first cover 540" means "first cover 540 at the closed position P2*a*".

First Cover 540

In FIG. 1B, the first cover 540 covers the space between the inner side surfaces 207L and 207R in the left-right direction 9. As shown in FIG. 2B, the upper end of the first cover 540 is located at a higher position than the nip position P1*b*, and the lower end of the first cover 540 is located at a lower position than the upper end of the guide surface 412B. The first cover 540 is an example of a first cover.

As shown in FIGS. 2A and 2B, the first cover 540 is located rearward of the feed trays 410A and 410B, and is located at the outer side (that is, rearward and upward) of the guide 520 and the second cover 530. Specifically, the first cover 540, except for the upper end thereof, is located rearward of the guide 520 and the second cover 530.

As shown in FIG. 5B, the first cover 540 has a guide surface 541. As shown in FIG. 2A, the guide surface 541 defines the outer side (that is, the rear side and the lower side) of the curved portion 441B. The guide surface 541 extends upward from a position rearward of the guide surface 412B, and reaches a slightly upward and rearward position of the nip position P1*b*, thereby defining the outer side of the curved portion 441B.

As shown in FIG. 5B, the guide surface 541 has a symmetrical shape. The guide surface 541 has a left-right size slightly larger than the curved portion 441B and larger than the left-right size of the second cover 530. The guide surface 541 has a vertical size which is larger than the guide surface 534. In a state where the first cover 540 is located at the closed position P2*a*, the outer shape of the guide surface 541 includes the second cover 530 at the mount position when viewed from the rear.

The guide surface 541 may be formed of a single curved surface as in the present embodiment. Alternatively, the guide surface 541 may be formed of the tip surfaces of a large number of ribs arranged at intervals in the left-right direction 9.

As shown in FIG. 1B, the first cover 540 has a rear surface 542. The rear surface 542 is exposed to the outside between the rear surfaces 206L and 206R. At a position slightly above the center portion of the rear surface 542, a concave portion for the user to handle when opening and closing the first cover 540 is formed as a handle 543.

As shown in FIG. 5B, the first cover 540 includes protruding portions 545L and 545R.

The protruding portion 545L has a plate-like shape which is thin in the left-right direction 9, and protrudes forward from a position leftward of the guide surface 541 from the upper end to the lower end of the first cover 540. A shaft hole 547L is located near the lower end of a left side surface 546L of the protruding portion 545L.

The protruding portion 545R is symmetrical with the protruding portion 545L, and a shaft hole 547R symmetrical with the shaft hole 547L is located on a right side surface 546R. The shafts 213L and 213R are inserted into the shaft holes 547L and 547R, respectively.

Concave portions 548L and 548R are formed near the upper ends of the protruding portions 545L and 545R, respectively. The concave portion 548L is recessed rearward from the protruding end face of the protruding portion 545L. Specifically, the concave portion 548L is defined by an upper surface, a lower surface, and a rear surface, and has a shape that is open to the front and both to the left and right. The concave portion 548R is symmetrical with the concave portion 548R.

Positioning Pin 214L, 214R

As shown in FIG. 5B, the printer 100 includes positioning pins 214L and 214R. The positioning pin 214L protrudes to the right from the same front-rear position and vertical position as the concave portion 548L on the inner side surface 207L of the housing 200. The positioning pin 214R protrudes to the left from the same front-rear position and vertical position as the concave portion 548R on the inner side surface 207R.

The positioning pins 214L and 214R fit into the concave portions 548L and 548R, respectively. As a result, the first cover 540 is positioned at the closed position P2*a* and closes the curved portion 441B of the conveyance path 440B. When the user puts a hand on the handle 543 of the first cover 540 (see FIG. 1B) and applies a force in the separation direction, the concave portions 548L and 548R separates from the positioning pins 214L and 214R in the separation direction. With this operation, the first cover 540 moves from the closed position P2*a* to the open position P2*b*, and opens the curved portion 441B to the outside (see FIG. 2B).

The inner side surfaces 207R and 207L may be provided with a stopper member so that the first cover 540 does not move in the separation direction farther from the open position P2*b*. A stopper member may not be provided. In this case, the movement of the first cover 540 in the separation direction is restricted by the installation surface of the printer 100 and so on.

Intermediate Conveyance Roller Pair 490, Conveyance Motor 551B

As shown in FIGS. 2A, 2B and 4A, 4B, the intermediate conveyance roller pair 490 has a pair of rollers 490A and 490B. The rollers 490A and 490B are a drive roller and a follow roller, respectively. Alternatively, the rollers 490A and 490B may be a follow roller and a drive roller, respectively. The follow roller may be a plurality of pinch rollers and so on.

In FIG. 4B, the rollers 490A and 490B are located between the inner side surfaces 207L and 207R. Each of the rollers 490A and 490B is supported by a frame (not shown) within the housing 200 so as to extend in the left-right direction 9 and rotate about its respective axis.

As shown in FIG. 2A, the rollers 490A and 490B are located between the upper end of the guide surface 412B and the lower end of the second cover 530 in the vertical direction 7. That is, the intermediate conveyance roller pair 490 of this embodiment is located below the second cover 530. The rollers 490A and 490B contact each other at approximately the same position as the upper end of the guide surface 412B in the front-rear direction 8. The roller 490B is located at a position forward from the first cover 540 and rearward and slightly downward of the roller 490A. The vertical position, the front-rear position, and the left-right position of the intermediate conveyance roller pair 490 are an example of a position not interfering with the second cover 530.

The conveyance motor 551B is located away leftward or rightward from the conveyance roller pairs 450A and 450B in the left-right direction 9. As shown in FIG. 2A, the conveyance motor 551B is located between the lower end of the platen 470B and the upper end of the recording head 480A in the vertical direction 7. The conveyance motor 551B is located farther rearward than the recording head 480A and farther forward than the guide 520 in the front-rear direction 8. Further, the conveyance motor 551B is located in a space between the platen 470B and the conveyance roller pair 450A in the housing 200.

The conveyance motor 551B generates a driving force according to a driving signal transmitted by the controller 560. The driving force generated by the conveyance motor 551B is transmitted by a driving-force transmission mechanism (not shown) including a plurality of gears and so on, and is given to the roller 490A. This causes the roller 490A to rotate. The roller 490B is rotated by following the rotation of the roller 490A. By rotating, the rollers 490A and 490B nip the sheet 1B guided by the guide surface 412B and send the same to the supply port 443B. That is, by rotating, the intermediate conveyance roller pair 490 nips the sheet 1B conveyed through the curved portion 441B which is longer than the curved portion 441A and sends the same in the conveyance direction 5B.

The driving force of the conveyance motor 551B is also given to the feed roller 431B, the conveyance roller pair 450B, and the discharge roller pair 460B through the driving-force transmission mechanism. Alternatively, the feed roller 431B may be rotated by a driving force from a motor different from the conveyance motor 551B.

Sheet Sensor 550A, 550B

Figure 3B:
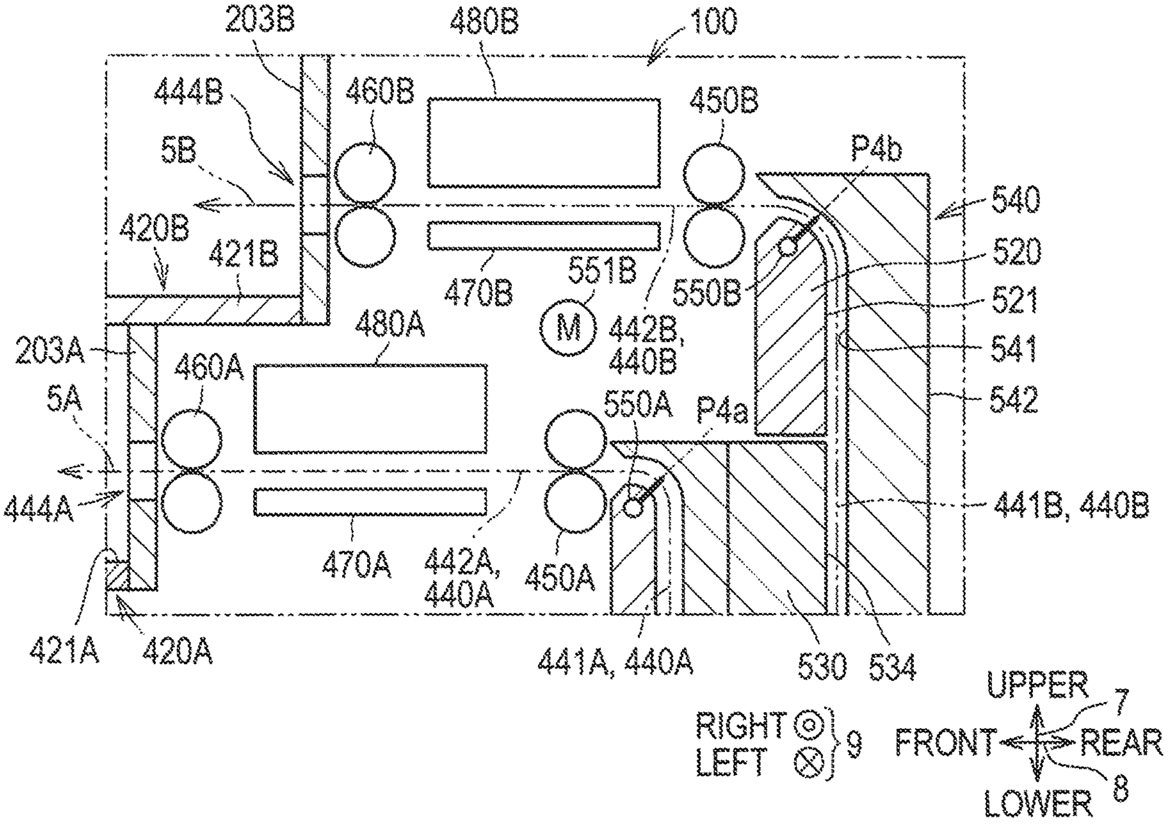
FIG. 3B is a schematic diagram showing detection positions P4*a* and P4*b* of sheet sensors 550A and 550B.

In FIG. 3B, the sheet sensors 550A and 550B are provided at detection positions P4*a* and P4*b* slightly upstream of the conveyance roller pairs 450A and 450B in the conveyance paths 440A and 440B. As shown in FIG. 3A, the sheet sensors 550A and 550B output sheet signals S1*a* and S1*b* to the controller 560, respectively. The sheet signal S1*a*, S1*b* has a level higher than or equal to a sheet threshold value described later when the sheet 1A, 1B is not at the detection position P4*a*, P4*b*, respectively. The sheet signal S1*a*, S1*b* has a level lower than the sheet threshold value when the sheet 1A, 1B is at the detection position P4*a*, P4*b*, respectively.

Controller 560

In FIG. 3A, the controller 560 includes a CPU, a ROM, a RAM, an EEPROM, an ASIC, and so on mounted on a control circuit board provided within the housing 200. The CPU, the ROM, the RAM, the EEPROM, and the ASIC are connected to each other so as to communicate with each other by an internal bus. The ROM stores a program and so on for controlling the operation of the printer 100. The CPU executes the program while using the RAM or the EEPROM.

In response to receiving a job transmitted by an information processing device capable of communicating with the printer 100, the controller 560 controls each component of the printer 100 in order to record an image based on image data in accordance with condition information.

Specifically, the controller 560 controls each component of the printer 100 so as to record an image based on image data contained in one of two jobs by using the recording head 480A and to record an image based on image data contained in the other job by using the recording head 480B.

In addition, in a case where image data indicating a plurality of images is included in one job, the controller 560 may control each component of the printer 100 so as to record some images by using the recording head 480A and to record the remaining images by using the recording head 480B.

Display 570

The display 570 is located near the upper end of the front surface 201R. The display 570 displays various images based on image data transmitted by the controller 560. The display 570 may be provided at another position at the housing 200.

Operation of Printer 100

As shown in FIG. 2A, in a state where the printer 100 is ready to record an image, the feed trays 410A and 410B are located within the housing 200. The second cover 530 is located at the mount position, and the first cover 540 is located at the closed position P2*a*. In this state, the user cannot access the conveyance paths 440A and 440B.

In response to receiving a job, the controller 560 starts image recording by using the recording heads 480A and 480B, and then periodically receives the sheet signals S1*a* and S1*b* from the sheet sensors 550A and 550B. The controller 560 determines whether the sheet signals S1*a* and S1*b* have fallen below the level threshold value within a particular time from the start of feeding by the feed mechanisms 430A and 430B.

In response to determining that both the sheet signals S1*a* and S1*b* are less than the level threshold value, no jam has occurred in the conveyance paths 440A and 440B, and the controller 560 continues the image recording using the recording heads 480A and 480B.

In response to determining that the sheet signal Sla is not less than the level threshold value, the controller 560 stops image recording using the recording heads 480A and 480B, assuming that a jam has occurred at the conveyance path 440A.

After stopping the image recording, the controller 560 transmits image data to the display 570 to cause the display 570 to display a first guidance image. The first guidance image is an image instructing the user to open the first cover 540 and the second cover 530 and remove the sheet 1A jammed at the conveyance path 440A. The user moves the first cover 540 at the closed position P2*a* to the open position P2*b*, and then removes the second cover 530 at the mount position in accordance with the contents shown in the first guidance image. The intermediate conveyance roller pair 490 is located at a lower position than the second cover 530 at the mount position. Thus, the intermediate conveyance roller pair 490 does not interfere with the second cover 530 in the process in which the user removes the second cover 530 rearward. In the process of removing the second cover 530, the guide surface 533 (see FIG. 4B) crosses the curved portion 441B of the conveyance path 440B. After removing the second cover 530, the user removes the sheet 1A jammed at the conveyance path 440A.

In response to determining that the sheet signal S1*b* is not less than the level threshold value, the controller 560 stops image recording using the recording head 480B, assuming that a jam has occurred at the conveyance path 440B. In this case, the controller 560 continues the image recording using the recording head 480A.

After stopping the image recording, the controller 560 causes the display 570 to display a second guidance image. The second guidance image is an image instructing the user to open the first cover 540 and remove the sheet 1B jammed at the conveyance path 440B. The user moves the first cover 540 at the closed position P2*a* to the open position P2*b* and then removes the sheet 1B jammed at the conveyance path 440B in accordance with the contents shown by the second guidance image.

When the jam processing by the user is finished, the controller 560 resumes the stopped image recording.

Operations and Effects of the Embodiment

According to the embodiment, even after the first cover 540 moves from the closed position P2*a* to the open position P2*b*, the second cover 530 stays at the mount position and maintains the state of forming the conveyance path 440A. Therefore, even if a jam occurs at the conveyance path 440B, it is unnecessary to stop the image recording using the recording head 480A. This suppresses a decrease in the operating rate of the printer 100.

Further, since the conveyance paths 440A and 440B have the curved portions 441A and 441B, the printer 100 can be reduced in height (that is, downsized).

Further, since each of the feed trays 410A and 410B is located below both the recording heads 480A and 480B in the housing 200, it is convenient for the user (good usability).

In addition, the second cover 530 defines the outer side (the rear side) of the conveyance path 440A and the inner side (the front side) of the conveyance path 440B. Thus, the printer 100 can be downsized in comparison with two covers that individually define the outer side of the conveyance path 440A and the inner side of the conveyance path 440B.

Further, since the first cover 540 includes the second cover 530 when viewed from the rear, the user cannot operate the second cover 530 when the first cover 540 is located at the closed position P2*a*. Thus, when a jam occurs at the conveyance path 440B, an erroneous operation is prevented, such as removing the second cover 530 before opening the first cover 540 while the image recording using the recording head 480A is being executed.

The second cover 530 is configured such that the guide surface 533 crosses the position of the curved portion 441B in the process of removing the second cover 530. With this configuration, the curved portion 441A of the conveyance path 440A can be easily opened.

According to the embodiment, since the feed trays 410A and 410B, the conveyance paths 440A and 440B, and the recording heads 480A and 480B are arranged in the housing 200 as described above, the path length of the curved portion 441B of the conveyance path 440B is longer than the curved portion 441A (see FIGS. 2A and 2B). However, since the intermediate conveyance roller pair 490 is located at the curved portion 441B, the sheet 1B is stably conveyed from the feed tray 410B to the conveyance roller pair 450B via the intermediate conveyance roller pair 490. Further, since the intermediate conveyance roller pair 490 is provided at a position where the intermediate conveyance roller pair 490 does not interfere with the second cover 530, the second cover 530 can be easily removed. Thus, the conveyance path 440A (more specifically, the curved portion 441A) can be easily opened.

Further, the intermediate conveyance rollers pair 490 is located at a lower position than the second cover 530. That is, the intermediate conveyance roller pair 490 is not provided at the second cover 530. Thus, the second cover 530 can be made lighter in weight.

Further, the feed roller 431 and the intermediate conveyance roller pair 490 are rotated by the driving force of the conveyance motor 551B. That is, the driving force is commonly used by the feed roller 431 and the intermediate conveyance roller pair 490. Since a motor is not required for each of the feed roller 431 and the intermediate conveyance roller pair 490, the printer 100 can be downsized.

Modifications

Hereinafter, various modifications of the printer 100 will be described. In the following description for the modifications, the differences from the embodiment will be described in detail, and the common points with the embodiment will be omitted or simplified.

First Modification (Intermediate Conveyance Roller Pair 490)

A printer 100 according to a first modification will be described while referring to FIGS. 6A to 8B.

The intermediate conveyance roller pair 490 in FIGS. 6A to 8B differs from the intermediate conveyance roller pair 490 of the embodiment in that the former is located at a higher position than the second cover 530. That is, the intermediate conveyance roller pair 490 of this modification is located above the second cover 530.

Figure 6A:
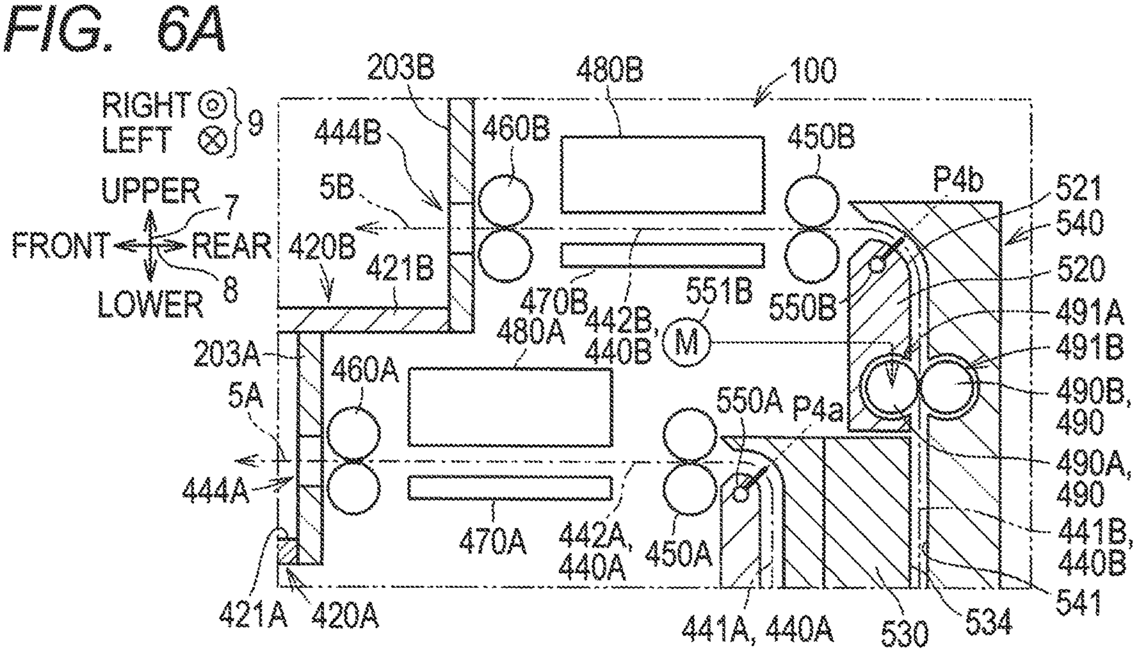

Specifically, in FIG. 6A, an accommodation space 491A is formed near the lower end of the guide 520. The accommodation space 491A is a concave portion that is long in the left-right direction 9 and is recessed forward from the guide surface 521, and accommodates the roller 490A.

Figure 6B:
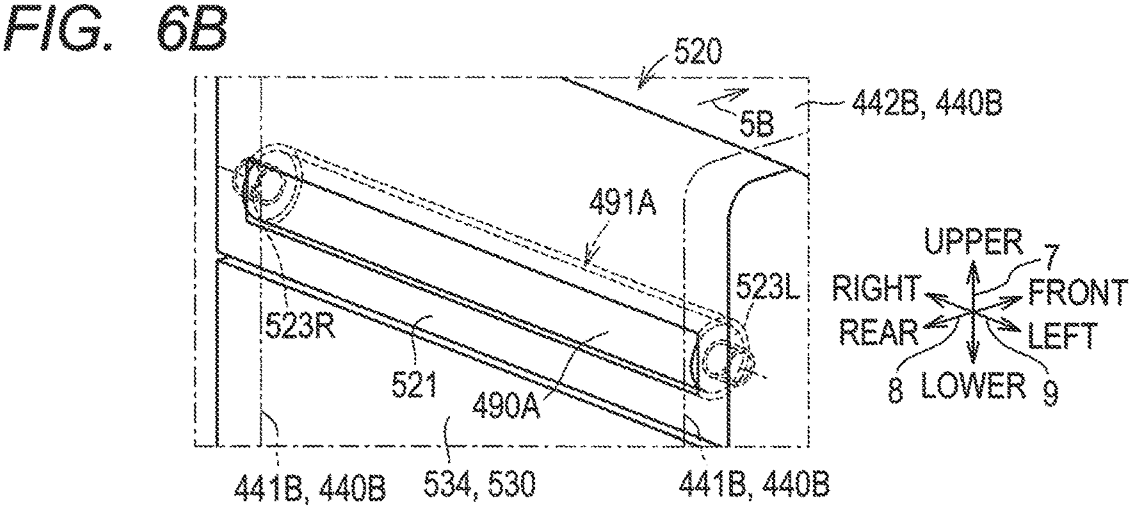

As shown in FIG. 6A, the accommodation space 491A has a substantially circular shape slightly larger than the outer diameter of the roller 490A when viewed from the left-right direction 9. As shown in FIG. 6B, the left and right ends of the accommodation space 491A are located outside the left and right ends of the curved portion 441B. The rear end of the accommodation space 491A is open to the curved portion 441B and is an opening extending within the guide surface 521 (see FIGS. 8A and 8B).

As shown in FIG. 6A, in the first cover 540, an accommodation space 491B is formed at a position opposite the accommodation space 491A in the front-rear direction 8 with the curved portion 441B interposed therebetween. The accommodation space 491B is a concave portion that is long in the left-right direction 9 and is recessed rearward from the guide surface 541, and accommodates the roller 490B.

Figure 6C:
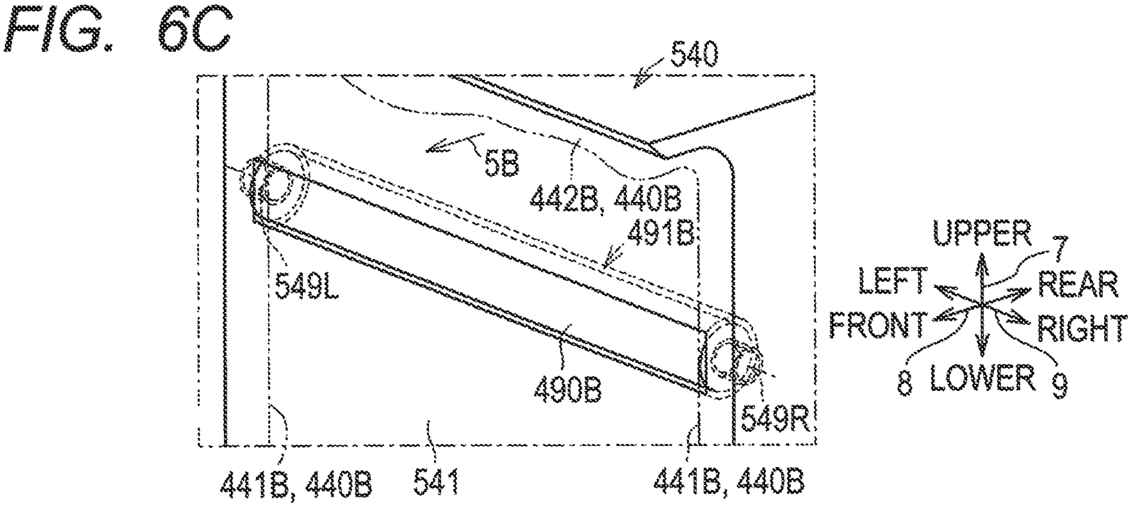
Figure 7A:
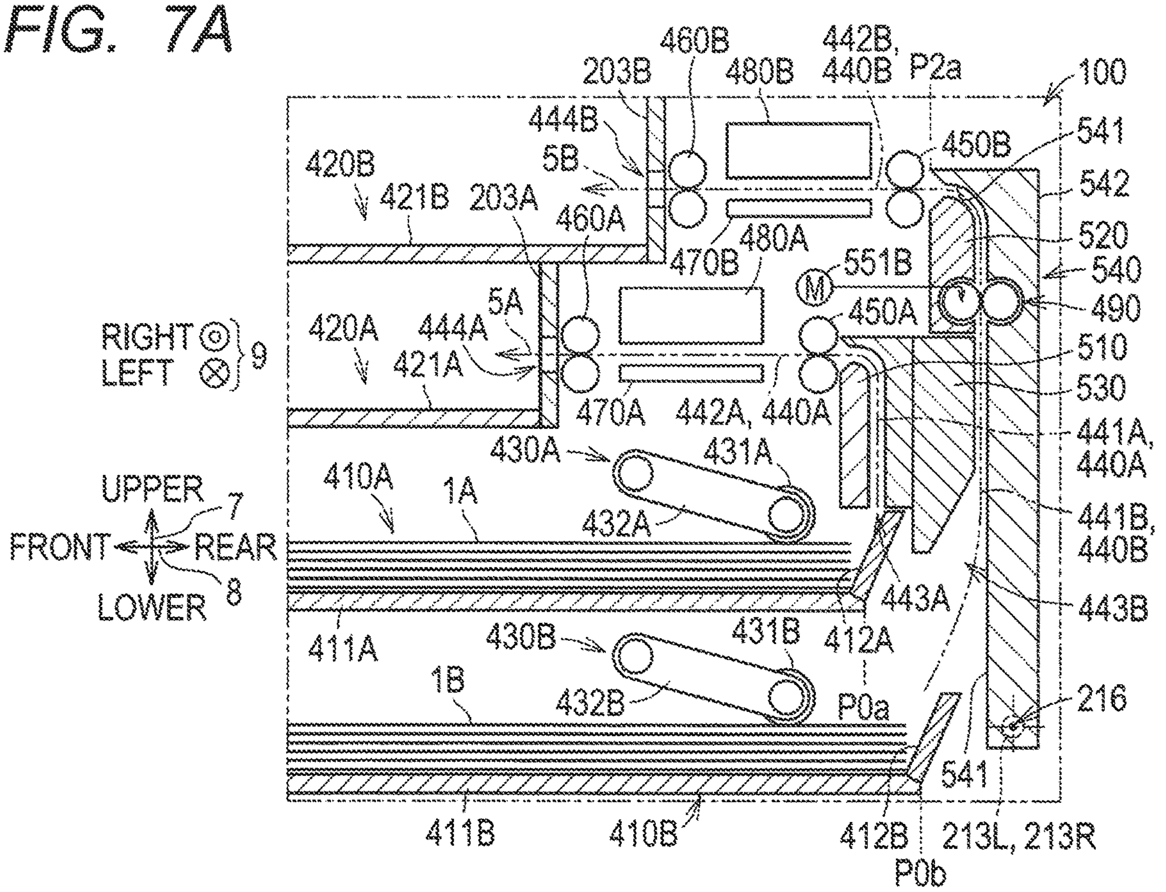
FIGS. 7A and 7B are schematic views showing the internal configuration of a printer 100 according to the first modification.
Figure 7B:
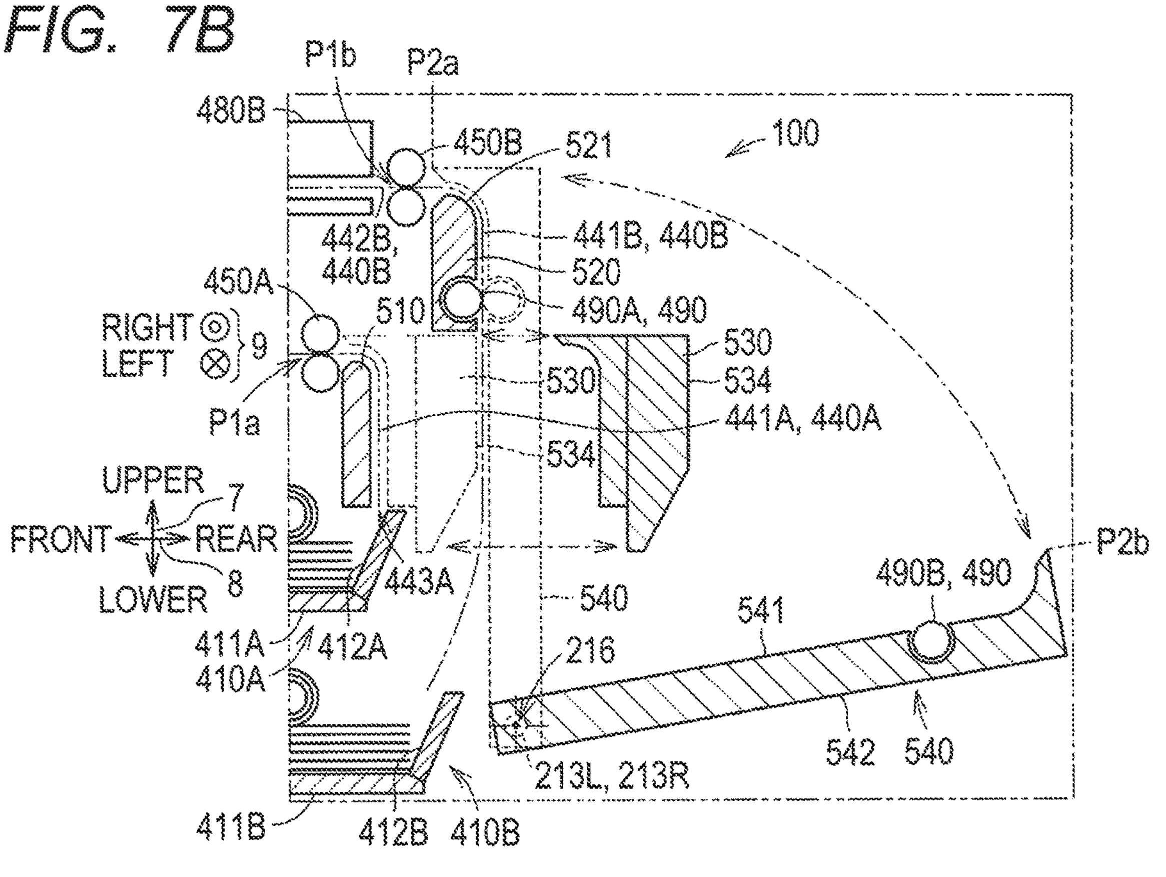
Figure 8A:
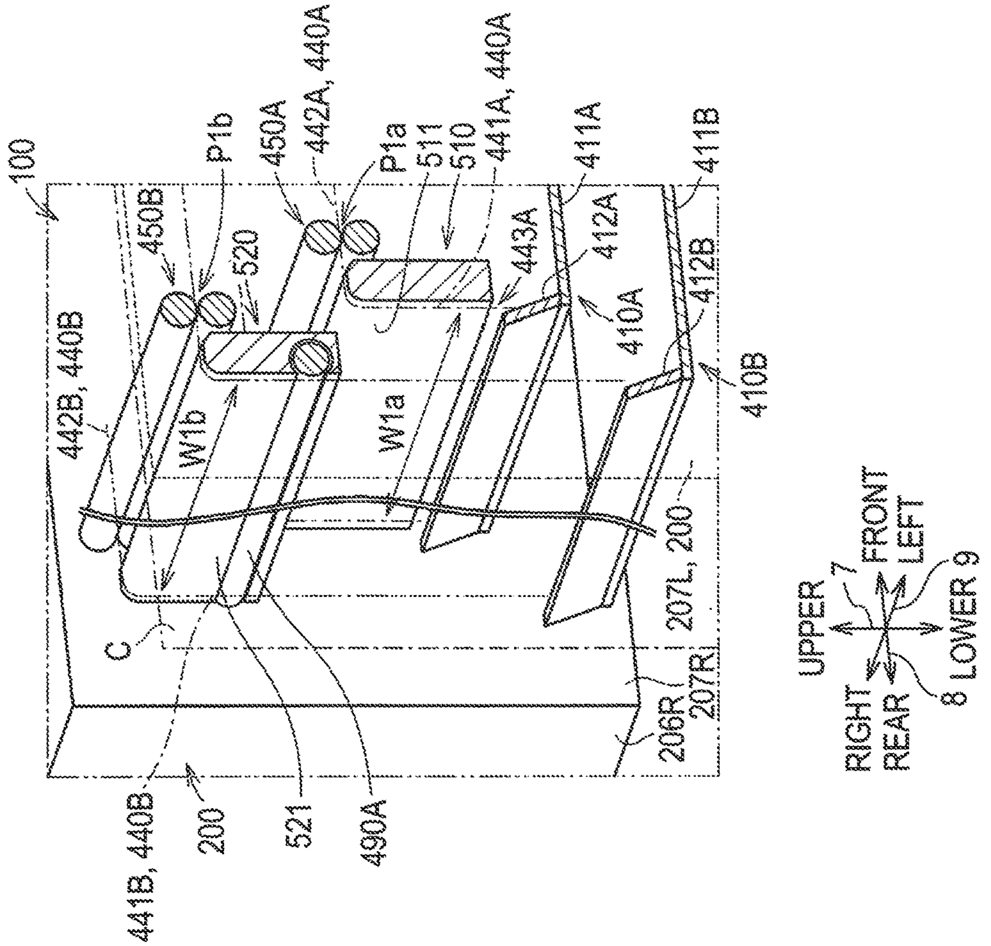
FIG. 8A is a perspective view schematically showing a guide 510, a guide 520, and an intermediate conveyance roller pair 490 when viewed from diagonally left rear, according to the first modification.
Figure 8B:
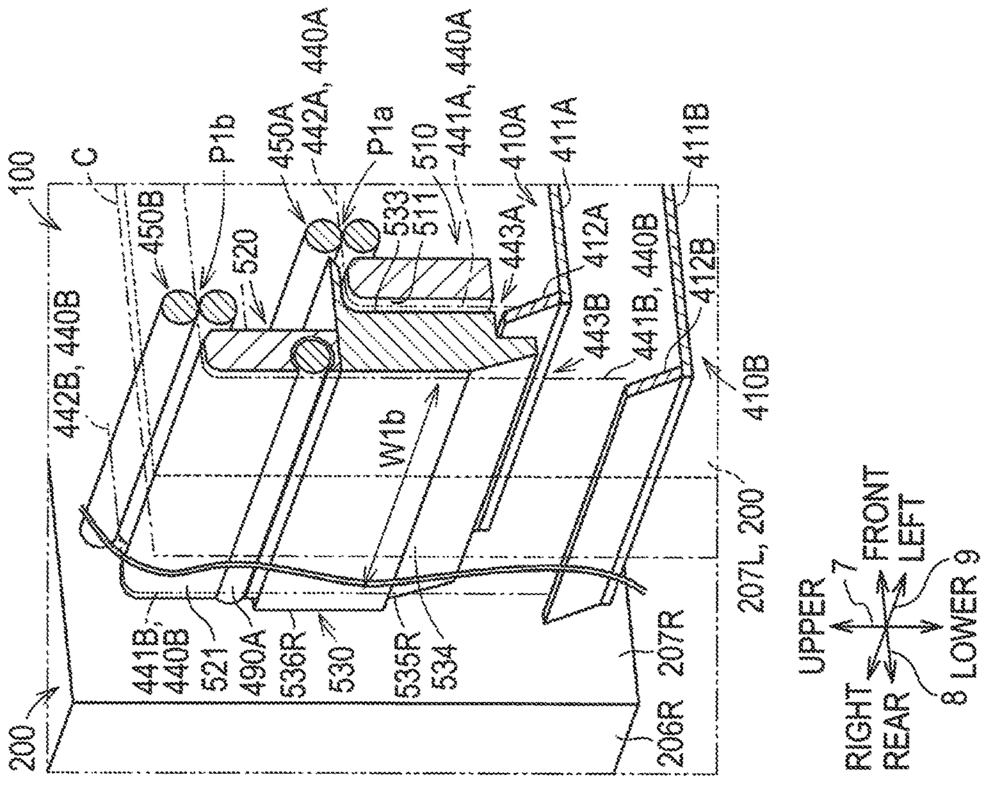
FIG. 8B is a perspective view schematically showing a second cover 530 and the intermediate conveyance roller pair 490 when viewed from diagonally left rear, according to the first modification.

In detail, as shown in FIG. 6A, the accommodation space 491B has a substantially circular shape slightly larger than the outer diameter of the roller 490B when viewed from the left-right direction 9. As shown in FIG. 6C, the left and right ends of the accommodation space 491B are located outside the left and right ends of the curved portion 441B. The front end of the accommodation space 491B is open to the curved portion 441B and is an opening extending within the guide surface 541.

The rollers 490A and 490B extend along the left-right direction 9 in the accommodation spaces 491A and 491B, respectively. Specifically, as shown in FIG. 6B, the roller 490A is rotatable about the axis of the roller 490A and is supported by bearings 523L, 523R provided at the left and right ends of the accommodation space 491A in the guide 520. As shown in FIG. 6C, the roller 490B is rotatable about the axis thereof and is supported by bearings 549L, 549R provided at the left and right ends of the accommodation space 491B in the first cover 540. As shown in FIGS. 6A, 7A, 7B, 8A, and 8B, the rollers 490A and 490B slightly protrude rearward and forward from the openings of the accommodation spaces 491A and 491B, respectively, and contact each other at the curved portion 441B.

As shown in FIG. 6A, the conveyance motor 551B is located between the recording heads 480A and 480B in the vertical direction 7. That is, the conveyance motor 551B is located near the conveyance roller pair 450B and the intermediate conveyance roller pair 490. This configuration shortens the length of the drive transmission path between the conveyance motor 551B and each of the conveyance roller pair 450B and the intermediate conveyance roller pair 490.

In the housing 200, the recording head 480B is located at a higher and farther rearward position than the recording head 480A (an example of the other side of the intersecting direction). This creates a space below the recording head 480B and rearward of the recording head 480A. Since the conveyance motor 551B is arranged in this space, it is possible to prevent the printer 100 from becoming large.

According to the first modification, the intermediate conveyance roller pair 490 is located at a higher position along the curved portion 441B than the second cover 530. Specifically, the roller 490A is provided at the guide 520, the roller 490B is provided at an upper position of the first cover 540 (see FIG. 7B). Since the intermediate conveyance roller pair 490 is located at the curved portion 441B, the sheet 1B is stably conveyed from the feed tray 410B to the conveyance roller pair 450B via the intermediate conveyance roller pair 490. Further, since the intermediate conveyance roller pair 490 is provided at a position where the intermediate conveyance roller pair 490 does not interfere with the second cover 530, the second cover 530 can be easily removed.

Second Modification (Intermediate Conveyance Roller Pair 490)

Figure 9A:
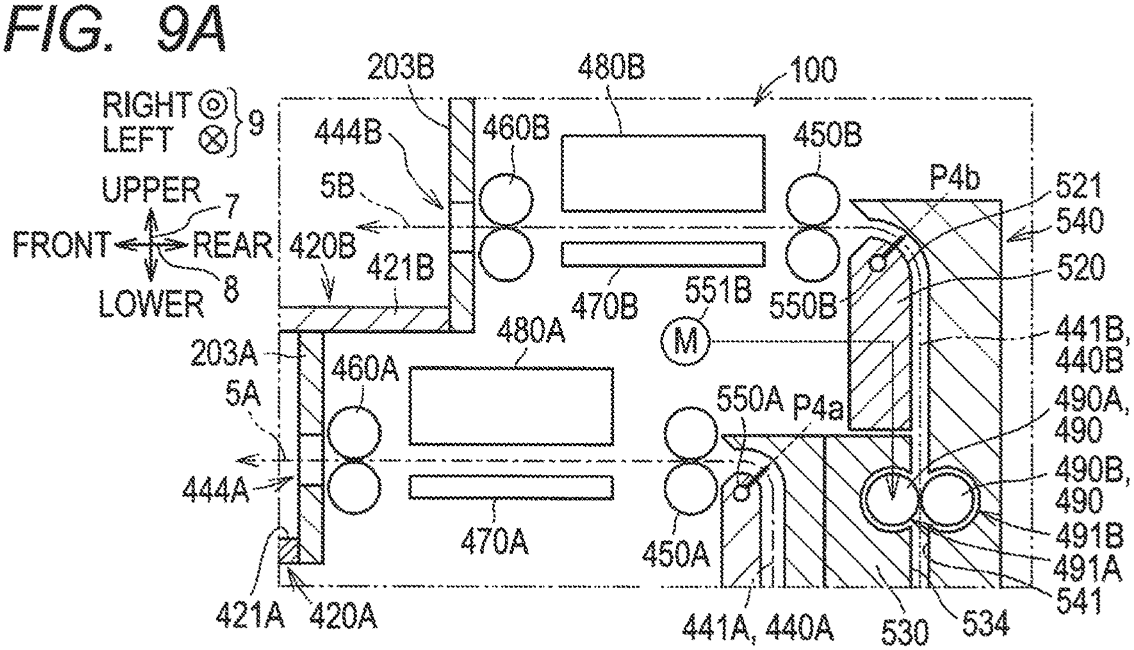
Figure 9B:
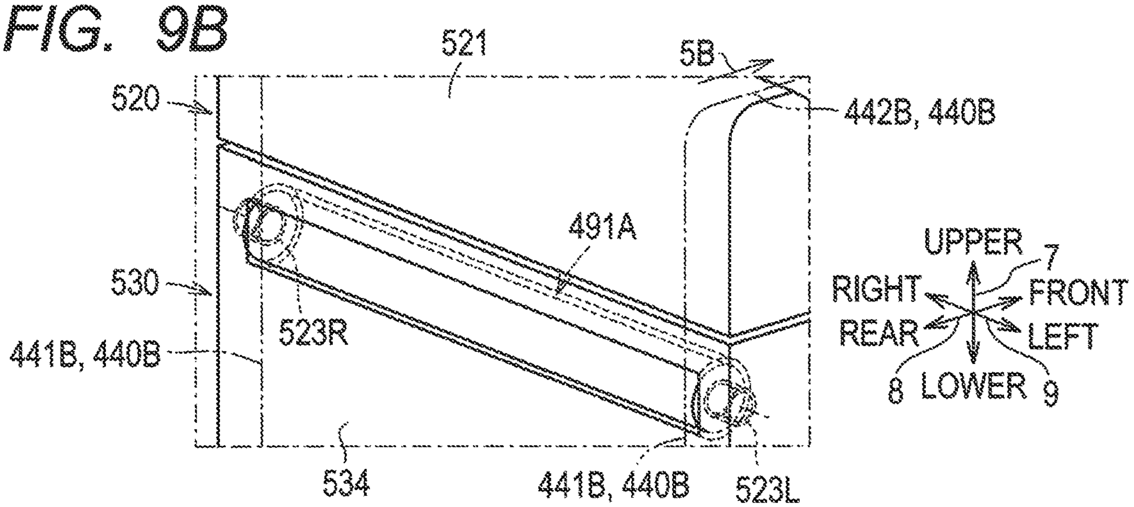
Figure 9C:
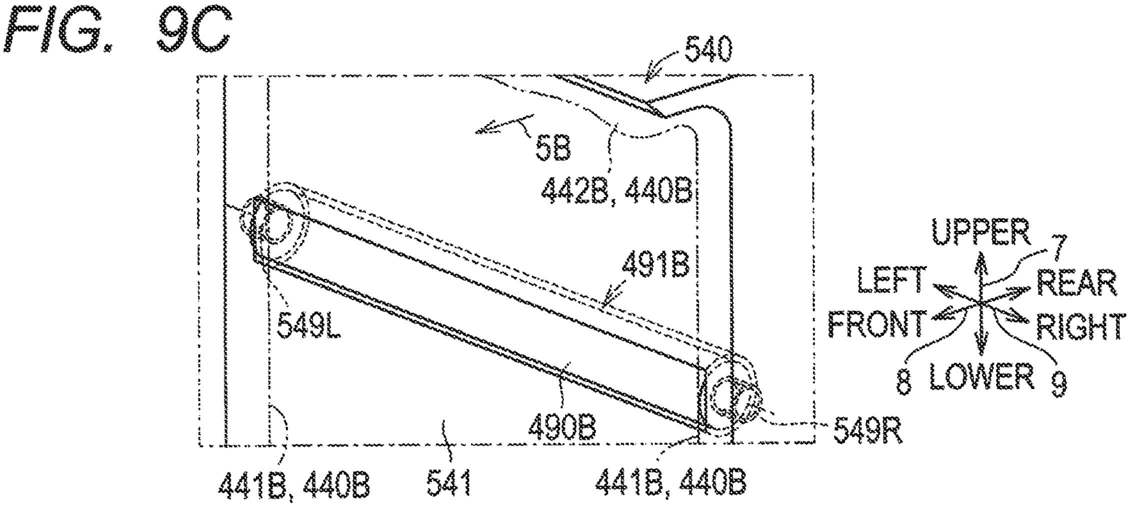

FIGS. 9A to 9C show an intermediate conveyance roller pair 490 according to a second modification.

The intermediate conveyance roller pair 490 of FIGS. 9A to 9C is substantially different from the intermediate conveyance roller pair 490 of FIGS. 6A to 8B in that the roller 490A is provided at the second cover 530 and the position of the roller 490B on the first cover 540 is different.

In FIGS. 9A and 9B, the accommodation space 491A is formed near the upper end of the second cover 530. The accommodation space 491A of FIGS. 9A and 9B has a shape in which the accommodation space 491A of FIGS. 6A and 6B is moved downward along the guide surface 521 and the guide surface 534.

In FIGS. 9A and 9C, the accommodation space 491B is formed at the first cover 540. The accommodation space 491B of FIGS. 9A and 9C has a shape in which the accommodation space 491B of FIGS. 6A and 6C is moved downward along the guide surface 541 to a position facing the accommodation space 491A of FIGS. 9A and 9B in the front-rear direction 8.

The rollers 490A and 490B are accommodated in the accommodation spaces 491A and 491B in the same manner as the first modification. The rollers 490A and 490B are examples of the second roller and the first roller.

According to the second modification, when the first cover 540 opens the curved portion 441B, the roller 490B is separated from the roller 490A, and thus the jam which has occurred in the curved portion 441B can be easily processed. Further, since the roller 490B is separated from the roller 490A together with the first cover 540 when the second cover 530 opens the curved portion 441A, the intermediate conveyance roller pair 490 does not interfere with the opening of the curved portion 441A.

Third Modification (Intermediate Conveyance Roller Pair 490)

Figure 10A:
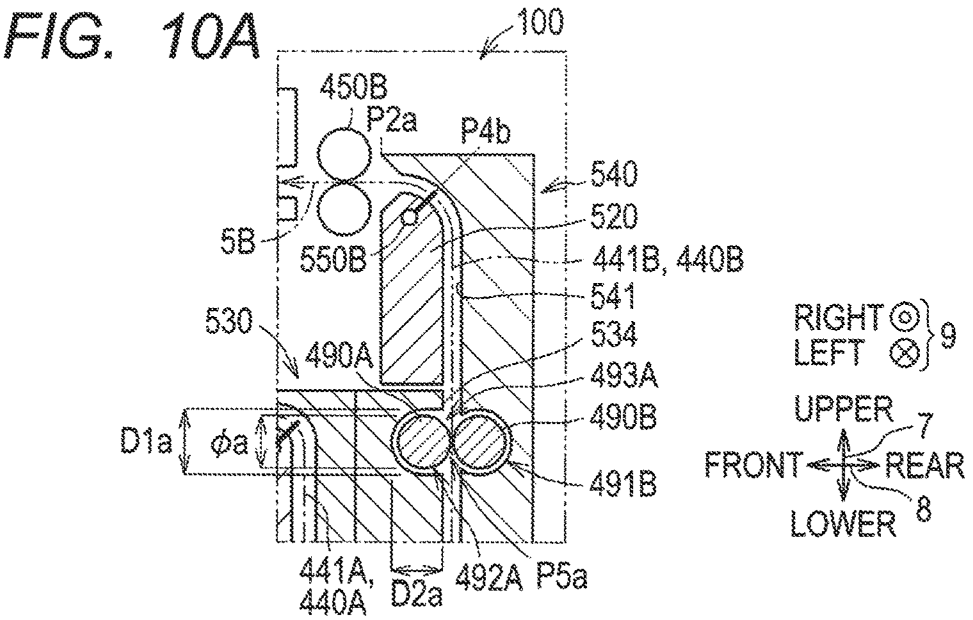
Figure 10B:
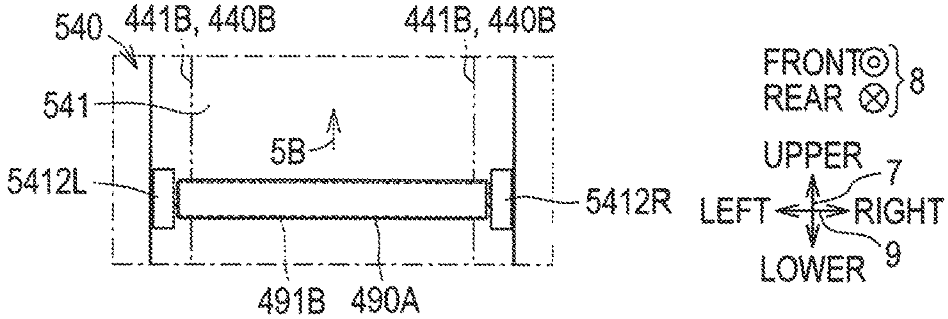
Figure 10C:
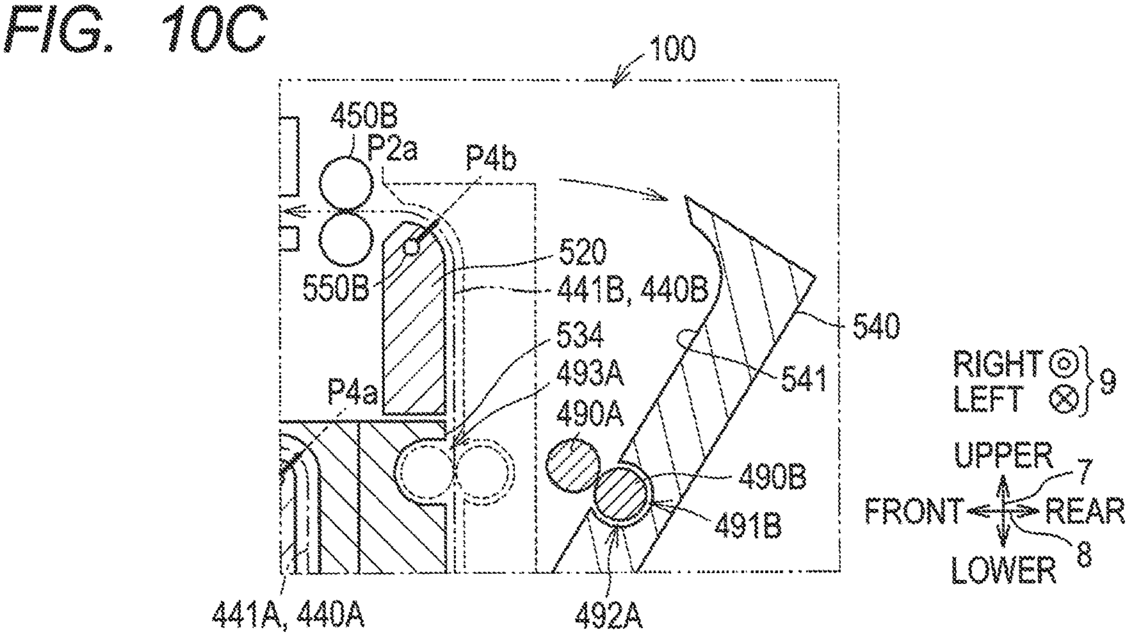

FIGS. 10A to 10C show an intermediate conveyance roller pair 490 according to a third modification.

The intermediate conveyance roller pair 490 of FIGS. 10A to 10C differs from the intermediate conveyance roller pair 490 of the second modification in that the roller 490A is provided at the first cover 540 (see FIG. 10B).

In FIG. 10A, the accommodation space 492A is formed in the second cover 530. The accommodation space 492A is a concave portion that is long in the left-right direction 9 and is recessed forward from the guide surface 534. The accommodation space 492A accommodates the roller 490A when the first cover 540 is located at the closed position P2*a*.

Specifically, the accommodation space 492A has a substantially semi-circular shape when viewed from the left-right direction 9. The rear end of the accommodation space 492A is an opening 493A that is open toward the rear. A vertical size D1*a* of the opening 493A is larger than the outer diameter φa (phi a) of the roller 490A. A distance (that is, depth) D2*a* from the guide surface 534 to the deepest part of the accommodation space 492A is approximately the same as the outer diameter φa (phi a).

In FIG. 10A, bearings 5412L and 5412R shown in FIG. 10B and so on are not shown.

In FIG. 10B, the first cover 540 further includes the bearings 5412L and 5412R. The bearings 5412L and 5412R protrude forward (that is, in the direction opposite to the separation direction) from the farther leftward and rightward positions of the accommodation space 491B on the guide surface 541. In FIG. 10B, the outline of the accommodation space 491B on the guide surface 541 is shown by a broken line, and the roller 490B and bearings 549L and 549R located rearward of the roller 490A are not shown. The roller 490A is bridged between the bearings 5412L and 5412R so as to be rotatable about the axis of the roller 490A. The roller 490A has an axis parallel to the axis of the roller 490B and contacts the roller 490B (see FIG. 10A).

As shown in FIGS. 10A and 10C, the roller 490B is always accommodated in the accommodation space 491B. As shown in FIG. 10A, when the first cover 540 is located at the closed position P2*a*, the roller 490A is accommodated in the accommodation space 492A. At this time, a contact position P5*a* of the roller 490A and roller 490B is located at the curved portion 441B of the conveyance path 440B.

As shown in FIG. 10C, in the process in which the first cover 540 moves from the closed position P2*a* to the open position P2*b*, the roller 490A gets out of the accommodation space 492A.

According to the third modification, when the first cover 540 opens the curved portion 441B, the roller 490A separates from the second cover 530 together with the roller 490B. Thus, the intermediate conveyance roller pair 490 does not interfere with the second cover 530 when the second cover 530 opens the curved portion 441A.

Alternatively, the intermediate conveyance roller pair 490 may be provided at the second cover 530 with a similar configuration to the third modification.

Fourth Modification (Lock Mechanism 700L, 700R)

Figure 11A:
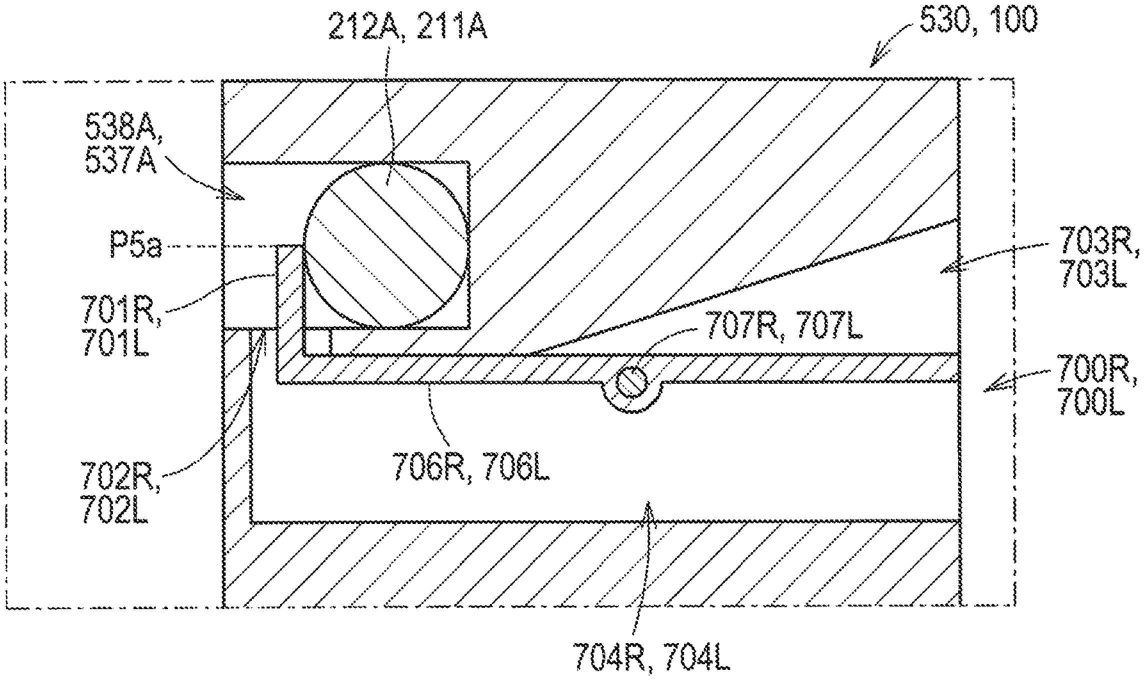
Figure 11B:
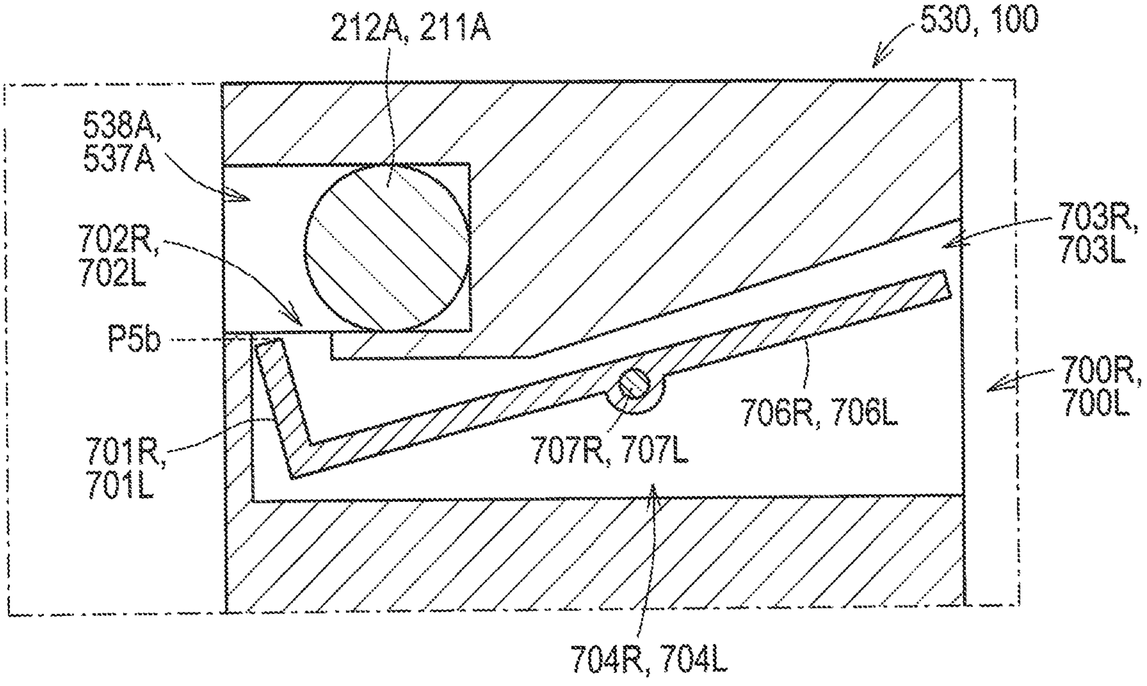

The second cover 530 according to a fourth modification shown in FIGS. 11A and 11B is different from the configuration of FIG. 5A in that it is provided with lock mechanisms 700L and 700R.

The lock mechanism 700R switches between a lock state (see FIG. 11A) in which the second cover 530 is locked at a mount position and a release state (see FIG. 11B) in which the lock state is released. Specifically, the lock mechanism 700R has a stopper member 701R and a lever 706R.

In the second cover 530, the concave portion 538A has an opening 702R near the front end of the lower surface. The protruding portion 536R has an opening 703R at the rear surface. In the second cover 530, an accommodation space 704R extending rearward from the opening 702R to the opening 703R is formed. The stopper member 701R is accommodated near the front end of the opening 702R.

A lever 706R extends from the lower end of the stopper member 701R through the accommodation space 704R to the opening 703R. The lever 706R is swingably supported by the second cover 530 about a shaft 707R extending in the left-right direction 9 at the middle position between the front end and the rear end. A torsion spring (not shown) is attached to the shaft 707R, whereby the stopper member 701R is urged upward.

The stopper member 701R moves up and down between an upper position P5*a* (see FIG. 11A) and a lower position P5*b* (see FIG. 11B). The upper position P5*a* is the position of the upper end of the stopper member 701R when no moment is applied to the torsion spring, and is a higher position than the lower surface of the concave portion 538A. The lower position P5*b* is substantially the same position as or lower position than the lower surface of the concave portion 538A.

The lock mechanism 700L is symmetrical with the lock mechanism 700R, has the same configuration as in FIG. 11A, and operates in the same manner as the lock mechanism 700R. Thus, the description of the lock mechanism 700L will be omitted.

In the process of attaching the second cover 530 to the mount position, the user first moves the first cover 540 to the open position P2*b*. The user then puts his finger on the rear end of the lever 706R and moves the same upward within the opening 703R. With this operation, a downward force is applied to the stopper member 701R, and the stopper member 701R moves from the upper position P5*a* to the lower position P5*b* against the urging force of the torsion spring. In this state, the user attaches the second cover 530 to the mount position. The user then releases his finger from the lever 706R. As a result, the stopper member 701R moves from the lower position P5*b* to the upper position P5*a* by the urging force of the torsion spring. With this operation, the lock mechanism 700R becomes the lock state.

In the process of removing the second cover 530 from the mount position, the user moves the first cover 540 to the open position P2*b*, and then moves the rear end of the lever 706R upward with a finger. With this operation, the stopper member 701R moves from the upper position P5*a* to the lower position P5*b* and becomes the release state. In the release state, the user detaches the second cover 530 from the mount position.

In a state where the lock mechanism 700L and 700R are in the lock state, even if the second cover 530 at the mount position is contacted by the sheet 1A that is conveyed along the curved portion 441A of the conveyance path 440A and a rearward force is applied to the second cover 530, the second cover 530 is prevented from being displaced or detached rearward. Further, in a state where the printer 100 is ready to record an image, when the first cover 540 is located at the closed position P2*a*, the second cover 530 is covered by the first cover 540. Thus, the user cannot operate the lock mechanisms 700L and 700R.

Fifth Modification (Second Cover 530)

Figure 12A:
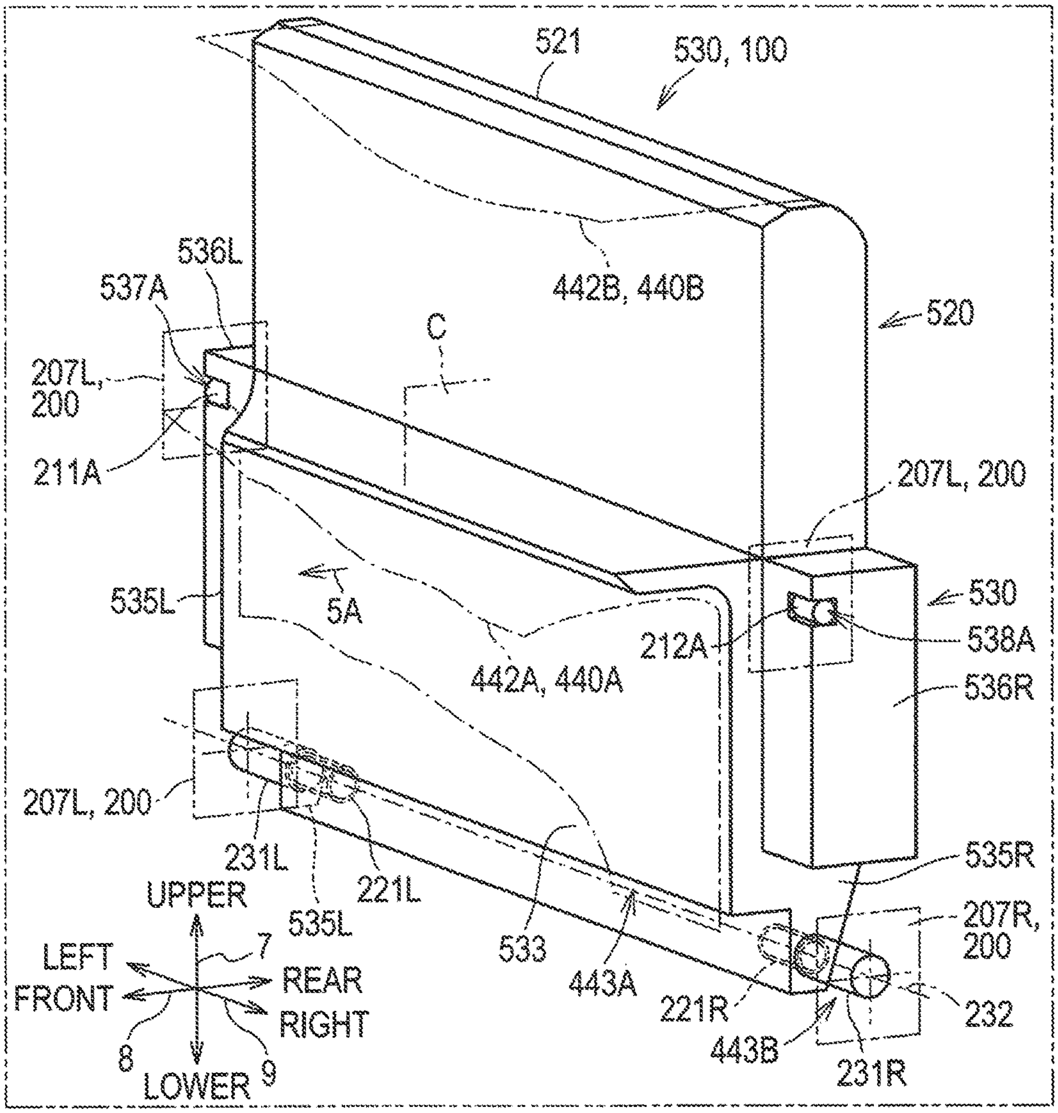
FIGS. 12A and 12B are schematic diagrams showing a second cover 530 according to a fifth modification.
Figure 12B:
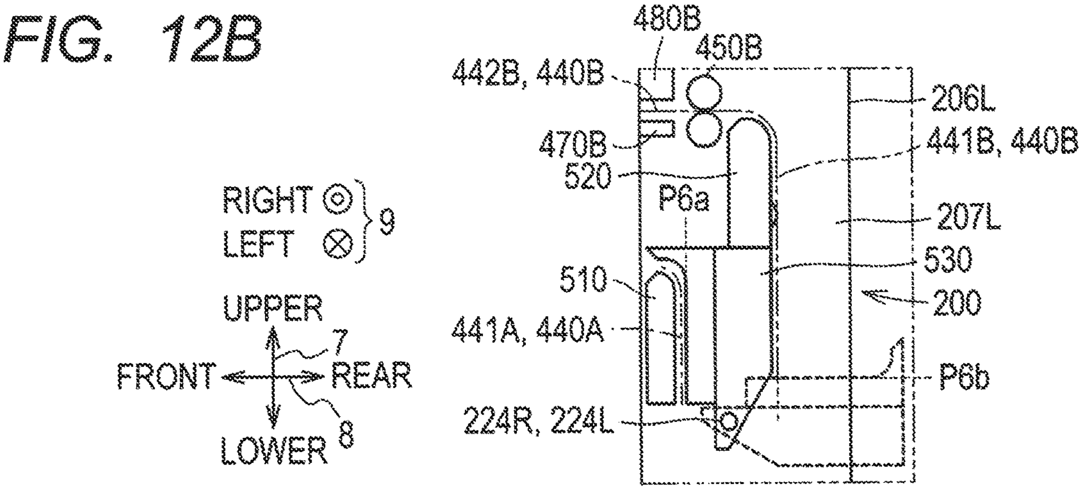

The second cover 530 according to a fifth modification shown in FIGS. 12A and 12B is differs from the configuration of FIGS. 4B and 5A in that the guide 520 and the second cover 530 are integrally formed and that the second cover 530 of this modification has shaft holes 221L and 221R instead of the concave portion 537B and 538B. Further, the inner side surfaces 207L and 207R of this modification are different in that they have shafts 231L and 231R instead of the positioning pins 211B and 212B.

Shaft 231L, 231R

In FIG. 12A, the shaft 231L protrudes to the right in parallel with the shaft 213L from the left inner shaft position which is a higher and farther forward position than the above-mentioned left outer shaft position on the inner side surface 207L. More specifically, the left inner shaft position is between the supply ports 443A and 443B, that is, between the upstream ends of the conveyance paths 440A and 440B in vertical direction 7. The shaft 231R protrudes to the left in parallel with the shaft 213R from the right inner shaft position, which is symmetrical with the left inner shaft position. The shafts 231L and 231R share an axis 232 along the left-right direction 9. The shafts 231L and 231R are located at positions shifted from the shafts 213L and 213R in the pulling direction of the feed trays 410A and 410B. The shafts 231L and 231R are parallel to the shafts 213L and 213R.

The shafts 231L and 231R are examples of an inner shaft (second shaft). The shafts 213L and 213R are examples of an outer shaft (first shaft).

Shaft Hole 221L, 221R

The shaft hole 221L is located near the lower end of the side surface 535L in the second cover 530. The shaft hole 221R is formed at a symmetrical position with the shaft hole 221L on the side surface 535R of the second cover 530. The shafts 231L and 231R are inserted into the shaft holes 221L and 221R, respectively.

Due to the above configuration, as shown in FIG. 12B, the second cover 530 is supported by the housing 200 so as to rotatably move together with the guide 520 between a closed position P6*a* and an open position P6*b* in the circumferential direction of the axis 232. The closed position P6*a* is the position of the second cover 530 in a state where the concave portions 537A and 538A fit to the positioning pins 211A and 212A and the second cover 530 defines the outside (the rear side) of the curved portion 441A of the conveyance path 440A (an example of the other side in the intersecting direction). The closed position P6*a* is another example of the second closed position. The open position P6*b* is a position separated from the closed position P6*a* in a direction away from the curved portion 441A in the circumferential direction of the axis 232. The open position P6*b* is also the position of the second cover 530 where the guide surface 511 of the guide 510 is exposed to the external space.

According to the above configuration, the user only needs to fit the two concave portions 537A and 538A to the two positioning pins 211A and 212A, and thus the guide surface 511 can be easily exposed. Further, the shafts 231L and 231R protrude from positions between the upstream end of the conveyance path 440A and the upstream end of the conveyance path 440B, and the shafts 213L and 213R protrude from positions lower than the upstream end of the conveyance path 440B. Thus, the guide surface 511, the guide surface 521, and the guide surface 534 can be easily exposed.

In the process in which the second cover 530 moves between the closed position P6*a* and the open position P6*b*, the guide surface 533 crosses the position of the curved portion 441B of the conveyance path 440B. Thus, the curved portion 441A of the conveyance path 440A can be easily opened.

Sixth Modification (Second Cover 530, First Cover 540)

Figure 13A:
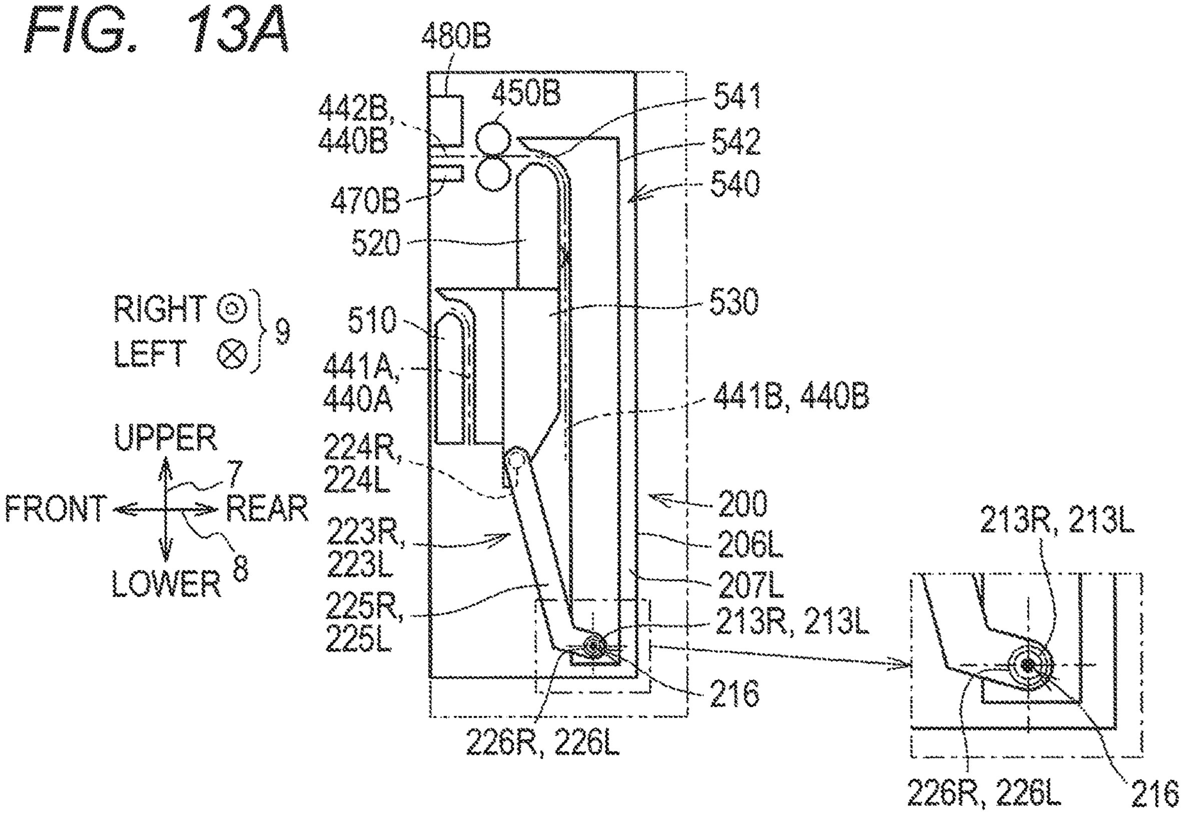
FIGS. 13A and 13B are schematic diagrams showing a second cover 530 according to a sixth modification.
Figure 13B:
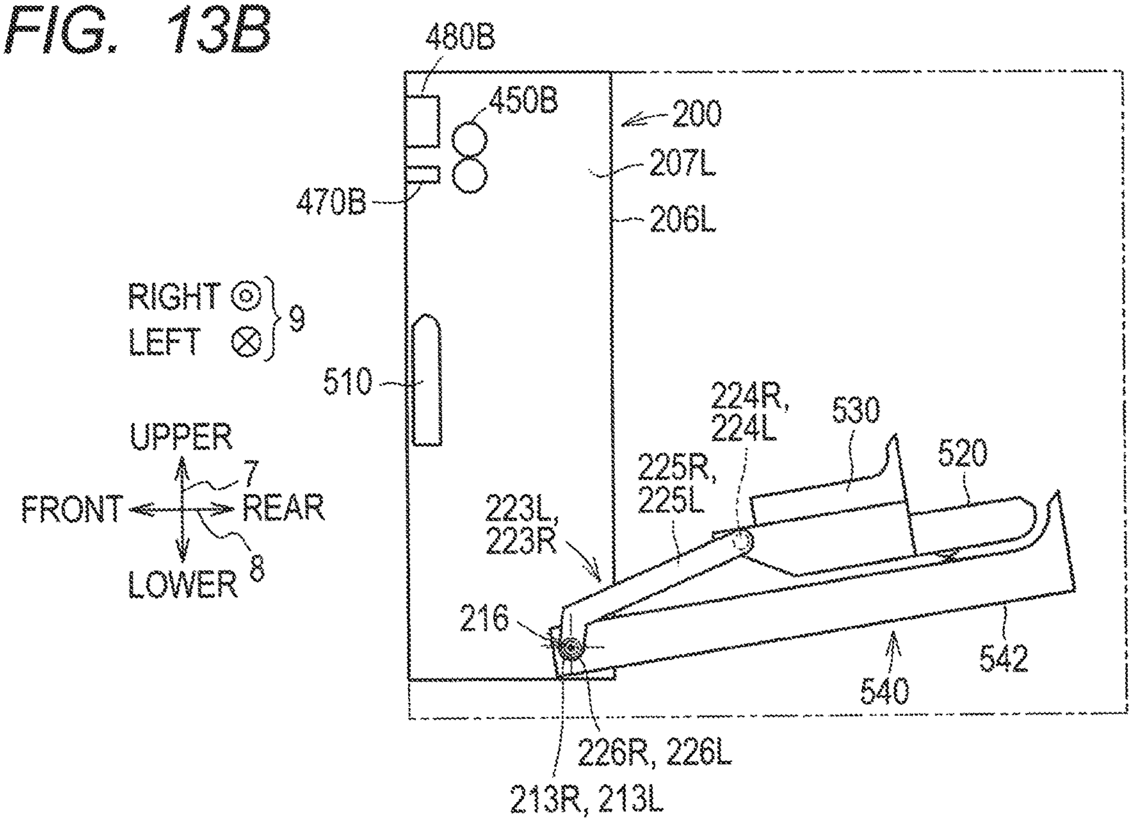

The second cover 530 according to a sixth modification shown in FIGS. 13A and 13B is different from the configuration of FIG. 12B in that the second cover 530 of this modification has a pair of arms 223L and 223R instead of the shaft holes 221L and 221R. The inner side surfaces 207L and 207R differ in that the inner side surfaces 207L and 207R of this modification do not have shafts 231L and 231R.

In FIGS. 13A and 13B, the arm 223R extends from the lower right corner of the second cover 530 through the right side of the first cover 540 to the shaft 213R. Specifically, the arm 223R has a base portion 224R and a connecting portion 225R. The base portion 224R protrudes to the right from a position near the lower end on the side surface 535R of the second cover 530 and slightly to the right of the side surface 546R of the first cover 540. The connecting portion 225R has an elongated plate shape which is thin in the left-right direction 9. The connecting portion 225R extends rearward from the protruding end of the base portion 224R, passes immediately to the right of the side surface 546R, and reaches a position slightly rearward of the shaft 213R. A shaft hole 226R through which the shaft 213R is inserted is formed at the end of the connecting portion 225R.

The arm 223L includes a base portion 224L, a connecting portion 225L, and shaft hole 226L which are symmetrical with the base portion 224R, the connecting portion 225R and the shaft hole 226R, respectively.

As described above, the arms 223L and 223R extend from the left side and the right side of the shafts 213L and 213R in the axial direction in which the axis 232 extends. The arms 223L and 223R are rotatably supported by the shafts 213L and 213R via shaft holes 226L and 226R at farther leftward and rightward positions (farther outward positions in the axial direction) than the first cover 540. With this configuration, the shafts 213L and 213R are shared by the second cover 530 and the first cover 540. The shafts 213L and 213R are examples of a common shaft.

In the sixth modification, the arms 223L and 223R extends from the lower left and lower right corners of the second cover 530 through the left and right sides of the first cover 540 to reach the shafts 213L and 213R. Alternatively, the connecting portion 225R may extend from the protruding end of the base portion 224R through a slit-shaped gap formed to the left of the side surface 546R in the first cover 540 to reach the shaft 213R.

Seventh Modification

Figure 14:
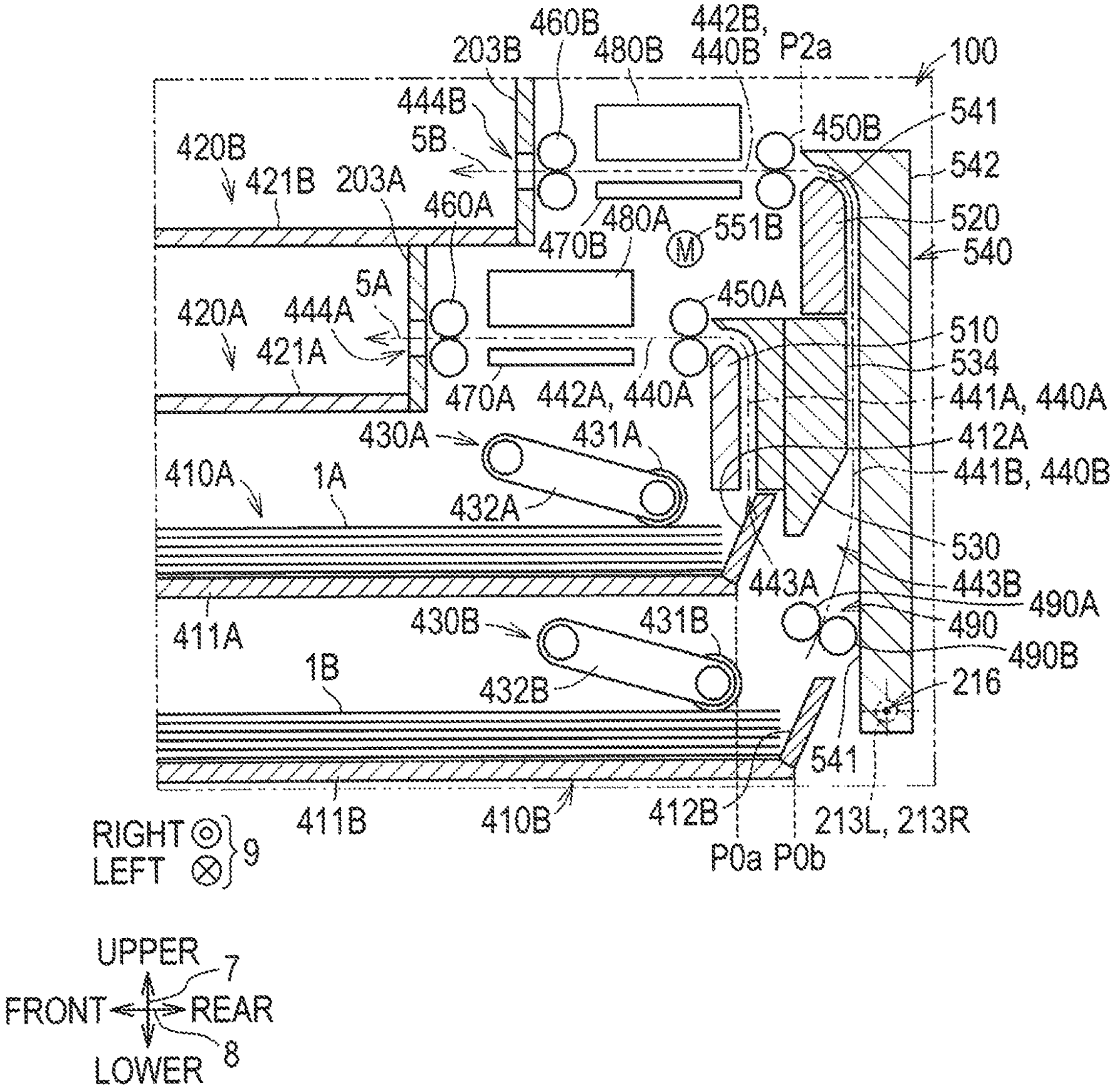
FIG. 14 is a schematic view showing the internal configuration of a printer 100 according to a seventh modification.

In a printer 100 according to a seventh modification shown in FIG. 14, the feed mechanism 430A is shifted rearward from the position of FIG. 2A, and the distance between the feed roller 431B and the guide surface 412B is equal to the distance between the feed roller 431A and the guide surface 412A. In this configuration, the sheet feed position of the feed tray 410B (the sheet discharge position from the feed tray 410B) is located farther rearward than the sheet feed position of the feed tray 410A (the sheet discharge position from the feed tray 410A). More specifically, the guide surface 412B (the sheet feed position of the feed tray 410B) is located farther rearward than the guide surface 412A (the sheet feed position of the feed tray 410A). That is, the guide surface 412B is closer to the rear end of the housing 200 (the rear surfaces 206L, 206R) than the guide surface 412A is in the front-rear direction 8. Further, the feed roller 431B is located farther rearward than the feed roller 431A. That is, the feed roller 431B is closer to the rear end of the housing 200 (the rear surfaces 206L, 206R) than the feed roller 431A is.

Other Modifications

The conveyance paths 440A and 440B may be so-called S-shaped paths or straight paths.

In the case of the S-shaped path, a curved portion different from the curved portion 441A connects a position between the recording head 480A and the platen 470A with the discharge tray 420A in the conveyance path 440A. A curved portion different from the curved portion 441B connects a position between the recording head 480B and the platen 470B with the discharge tray 420B in the conveyance path 440B. An inner cover and an outer cover similar to the second cover 530 and the first cover 540 may be provided for these other curved portions. In this case, the discharge trays 420A and 420B are examples of a first tray and a second tray.

In the case of a straight path, the feed trays 410A and 410B and the discharge trays 420A and 420B are located apart from each other in the front-rear direction 8 or in the left-right direction 9. The conveyance path 440A connects the feed tray 410A with the discharge tray 420A only by a straight portion, and the conveyance path 440B connects the feed tray 410B with the discharge tray 420B only by a straight portion. An inner cover and an outer cover similar to the second cover 530 and the first cover 540 may be provided on these straight portions.

The back surfaces 203A and 203B may be located at the same position in the front-rear direction 8. Similarly, the feed tray 410A, the conveyance roller pair 450B, the recording head 480B, the platen 470B, and the discharge roller pair 460B may be located directly above the feed tray 410B, the conveyance roller pair 450A, the recording head 480A, the platen 470A, and the discharge roller pair 460A, respectively.

At least a part of the second cover 530 may overlap the first cover 540 when viewed in the front-rear direction 8. This configuration also makes it difficult for the user to operate the second cover 530 when the first cover 540 is located at the closed position P2*a*, thereby suppressing an erroneous operation.

While the disclosure has been described in detail with reference to the above aspects thereof, it would be apparent to those skilled in the art that various changes and modifications may be made therein without departing from the scope of the claims.

What is claimed is:

1. An image recording apparatus comprising:

a housing having one end and an other end spaced apart from each other in a particular direction, a first conveyance path for a first sheet being formed in the housing, a second conveyance path for a second sheet being formed in the housing;

a first tray configured to support the first sheet;

a second tray configured to support the second sheet;

a first print engine, the first conveyance path connecting the first tray with the first print engine;

a second print engine, the second conveyance path connecting the second tray with the second print engine;

a first member having a first guide surface and configured to move between:

a first closed position at which the first guide surface guides the first sheet conveyed along the first conveyance path, the first member being located at the other end of the housing when the first member is located at the first closed position; and a first open position at which the first member opens at least part of the first conveyance path by separating from the first closed position; and a second member having a second guide surface and configured to move between:

a second closed position at which the second guide surface guides the second sheet conveyed along the second conveyance path, the second member being located closer to the one end than the first member when the first member is located at the first closed position and the second member is located at the second closed position, the second conveyance path being formed at a side of the second guide surface facing the one end when the second member is located at the second closed position; and a second open position at which the second member opens the second conveyance path by separating from the second closed position.

2. The image recording apparatus according to claim 1, wherein the second member is configured to move from the second closed position to the second open position independently of movement of the first member.

3. The image recording apparatus according to claim 1, wherein a vertical length of the second member positioned at the second closed position is shorter than a vertical length of the first member positioned at the first closed position.

4. The image recording apparatus according to claim 1, wherein at least part of the first member positioned at the first closed position is below the second member positioned at the second closed position.

5. The image recording apparatus according to claim 1, wherein at least part of the first member positioned at the first closed position is above the second member positioned at the second closed position.

6. The image recording apparatus according to claim 1, wherein at least part of the first member positioned at the first open position is below the second member positioned at the second open position.

7. The image recording apparatus according to claim 1, wherein the first conveyance path including a first portion covered by the first member when the first member is located at the first closed position;

wherein the second conveyance path including a second portion covered by the second member when the second member is located at the second closed position; and wherein a vertical length of the second portion is shorter than a vertical length of the first portion.

8. The image recording apparatus according to claim 1, wherein the first conveyance path including a first portion covered by the first member when the first member is located at the first closed position;

wherein the second conveyance path including a second portion covered by the second member when the second member is located at the second closed position; and wherein at least part of the first portion is below the second portion.

9. The image recording apparatus according to claim 1, wherein the first conveyance path including a first portion covered by the first member when the first member is located at the first closed position;

wherein the second conveyance path including a second portion covered by the second member when the second member is located at the second closed position; and wherein at least part of the first portion is above the second portion.

10. The image recording apparatus according to claim 1, wherein the second tray and the second print engine are located between the first tray and the first print engine in a vertical direction.

11. The image recording apparatus according to claim 10, wherein the second print engine is higher than the second tray, and the first print engine is higher than the first tray.

12. The image recording apparatus according to claim 11, wherein the first print engine is located between the first member and the one end of the housing in the particular direction.

13. The image recording apparatus according to claim 12, wherein the second print engine is located between the second member and the one end of the housing in the particular direction.

* * * * *